(12) United States Patent
Beard et al.

(10) Patent No.: US 11,593,139 B2
(45) Date of Patent: Feb. 28, 2023

(54) SOFTWARE COMPATIBILITY CHECKING FOR MANAGED CLUSTERS IN A VIRTUALIZED COMPUTING SYSTEM

(71) Applicant: VMware, Inc., Palo Alto, CA (US)

(72) Inventors: Derek William Beard, Austin, TX (US); Brian Charles Forney, Mountain View, CA (US); Mark Russell Johnson, McKinleyville, CA (US); Zachary James Shepherd, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 363 days.

(21) Appl. No.: 16/838,663

(22) Filed: Apr. 2, 2020

(65) Prior Publication Data

US 2021/0311763 A1 Oct. 7, 2021

(51) Int. Cl.
*G06F 9/455* (2018.01)
*G06F 8/65* (2018.01)

(52) U.S. Cl.
CPC ............ *G06F 9/45558* (2013.01); *G06F 8/65* (2013.01); *G06F 2009/4557* (2013.01)

(58) Field of Classification Search
None
See application file for complete search history.

(56) References Cited

U.S. PATENT DOCUMENTS

| 9,733,971 B2* | 8/2017 | Cropper .............. H04L 41/5096 |
| 2016/0057027 A1* | 2/2016 | Hinrichs ............... G06F 15/173 709/224 |
| 2017/0371693 A1 | 12/2017 | Corrie et al. |

(Continued)

OTHER PUBLICATIONS

Ernst, E. et al. "Kata Containers Architecture," GitHub, Inc., 2019, 22 pages, URL: https://github.com/kata-containers/documentation/blob/master/design/architecture.md.

(Continued)

*Primary Examiner* — Lewis A Bullock, Jr.
*Assistant Examiner* — Melissa A Headly
(74) *Attorney, Agent, or Firm* — Kim & Stewart LLP

(57) ABSTRACT

An example method of checking compatibility of a guest cluster executing as a virtual extension of a host cluster having an orchestration control plane managing the guest cluster, the host cluster being part of a software defined data center (SDDC), is described. The method includes: receiving, at the orchestration control plane, a guest cluster infrastructure software (GCIS) compatibility document that specifies what a GCIS of the orchestration control plane requires and offers; receiving a request for a compatibility check on the guest cluster with respect to the GCIS; obtaining, at the orchestration control plane in response to the request, an SDDC compatibility documents for the SDDC and a guest cluster compatibility document for the guest cluster; computing, at the orchestration control plane, the compatibility check in response to the GCIS compatibility document, the SDDC compatibility document, and the guest cluster compatibility document; and transmitting a result of the compatibility check from the orchestration control plane to a virtual infrastructure (VI) control plane of the SDDC.

20 Claims, 19 Drawing Sheets

(56) References Cited

U.S. PATENT DOCUMENTS

2018/0157532 A1* 6/2018 Kumar .................. G06F 9/5061
2018/0295036 A1* 10/2018 Krishnamurthy ... H04L 41/0895

OTHER PUBLICATIONS

Kubernetes, "Cluster API v1alpha2 released!" Community Forums, Sep. 2019, 3 pages, URL: https://discuss.kubernetes.io/t/announce-cluster-api-v1alpha2-released/7821.
Kubernetes, "The Cluster API Book," v1alpha2, 2019, 60 pages, URL: https://release-0-2.cluster.api.sigs.k8s.io/print.html.
Vmware, Inc. "Overview of vSphere Integrated Containers," Product version: 1.5, 2019, 21 pages.
U.S. Appl. No. 16/751,529, filed Jan. 24, 2020, 48 pages.

* cited by examiner

US 11,593,139 B2

SOFTWARE COMPATIBILITY CHECKING FOR MANAGED CLUSTERS IN A VIRTUALIZED COMPUTING SYSTEM

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into a logical unit called a "pod." Containers in the same pod share the same resources and network and maintain a degree of isolation from containers in other pods. The pods are distributed across nodes of the Kubernetes system and an image cache is provided on each node to speed up pod deployment. A node includes an operating system (OS), such as Linux®, and a container engine executing on top of the OS that supports the containers of the pod. Kubernetes control plane components (e.g., a kubelet) execute on the OS alongside the containers. Thus, a node includes multiple containers and control plane components executing on a shared OS.

Kubernetes nodes can be implemented using host operating systems executing on server-grade hardware platforms or using guest operating systems executing in virtual machines (VMs). A virtualized computing system, for example, can be complex involving clusters of virtualized hosts and associated management systems. Application developers are focused on developing applications for execution in a Kubernetes system and typically do not have expertise in managing the Kubernetes system itself. A developer/operator engineer can have expertise in infrastructure and application platforms in order to manage a Kubernetes cluster, but typically does not have expertise in managing complex virtualized infrastructure. A virtualized infrastructure (VI) administrator can have expertise in managing various on-premises, cloud, and hybrid virtualized infrastructures, but may not have the skills or experience to manage Kubernetes clusters and applications. It is desirable to provide a system that logically separates virtualized infrastructure management, cluster management, and application development. Further, it is desirable to allow a VI administrator to upgrade the underlying virtual infrastructure and control plane, and a developer/operator to upgrade an application platform executing on the virtual infrastructure, with minimal coordination.

SUMMARY

In an embodiment, a method of checking compatibility of a guest cluster executing as a virtual extension of a host cluster having an orchestration control plane managing the guest cluster, the host cluster being part of a software defined data center (SDDC), is described. The method includes: receiving, at the orchestration control plane, a guest cluster infrastructure software (GCIS) compatibility document that specifies what a GCIS of the orchestration control plane requires and supports; receiving a request for a compatibility check on the guest cluster with respect to the GCIS; obtaining, at the orchestration control plane in response to the request, an SDDC compatibility document for the SDDC and a guest cluster compatibility document for the guest cluster; computing, at the orchestration control plane, the compatibility check in response to the GCIS compatibility document, the SDDC compatibility document, and the guest cluster compatibility document; and transmitting a result of the compatibility check from the orchestration control plane to a virtual infrastructure (VI) control plane of the SDDC.

Further embodiments include a non-transitory computer-readable storage medium comprising instructions that cause a computer system to carry out the above methods, as well as a computer system configured to carry out the above methods.

DETAILED DESCRIPTION

Figure 1:
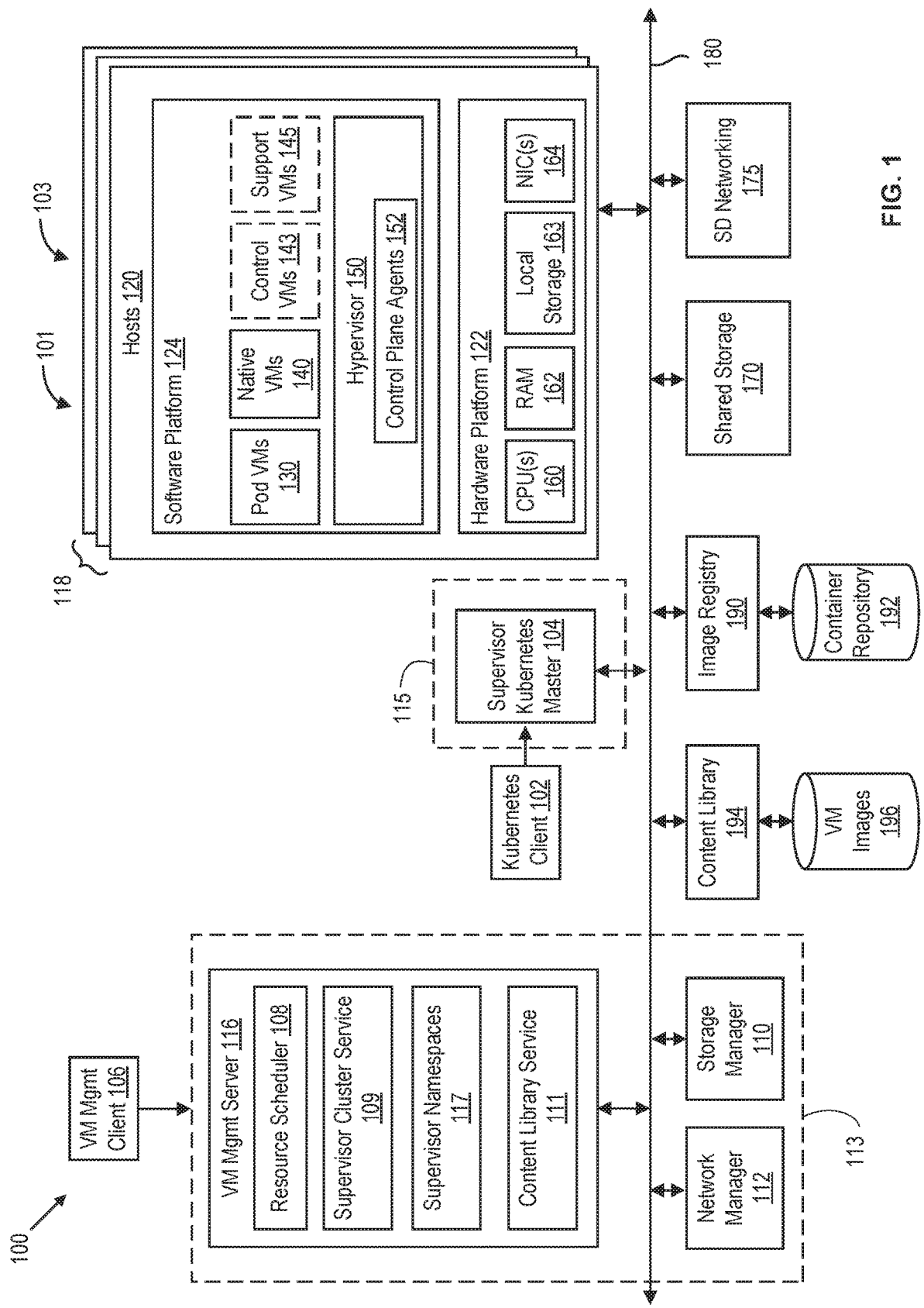
FIG. 1 is a block diagram of a virtualized computing system in which embodiments may be implemented.

Techniques for software compatibility checking for managed clusters in a virtualized computing system are described. The virtualized computing system includes a cluster of hosts having a virtualization layer executing on host hardware platforms. The virtualization layer supports execution of virtual machines (VMs). A virtualization management server manages host clusters, the virtualization layers, and the VMs executing thereon. In embodiments, the virtualization layer of a host cluster is integrated with a container orchestration control plane, such as a Kubernetes control plane. This integration provides a "supervisor cluster" that uses VMs to implement both control plane nodes and compute objects managed by the Kubernetes control plane. For example, Kubernetes pods are implemented as "pod VMs," each of which includes a kernel and container engine that supports execution of containers. The Kubernetes control plane of the supervisor cluster is extended to support VM objects in addition to pods, where the VM objects are implemented using native VMs (as opposed to pod VMs). A virtualization infrastructure administrator (VI admin) can enable a host cluster as a supervisor cluster and provide its functionality to development teams. The VI admin creates "supervisor namespaces" within the supervisor cluster control plane, which provide resource-constrained and authorization-constrained units of multi-tenancy. Development teams deploy their applications within the scope of the supervisor namespaces and subject to their constraints.

As described above, the supervisor cluster control plane is extended to support custom VM objects in addition to pods. In embodiments, the controlled extensibility of the supervisor cluster is leveraged to deliver a managed cluster as a custom object. The managed cluster is deployed as a virtual extension of the supervisor cluster described above (hence the managed cluster is referred to herein as a "guest cluster"). The guest cluster comprises a standard Kubernetes control plane and associated nodes, as well as components for interfacing the underlying supervisor cluster. The guest cluster executes within compute objects of managed by the supervisor cluster (e.g., native VMs or both native VMs and pod VMs) and utilizes networking and storage exposed by the supervisor cluster. In this manner, a guest cluster is a virtual extension of an underlying management cluster (i.e., the supervisor cluster). Guest clusters build on the workload management functionality provided by the supervisor cluster, which provides development teams with familiar control over cluster configuration and cluster lifecycle. Development teams can upgrade guest clusters to maintain aggressive currency with upstream Kubernetes distributions. Guest clusters provide a managed cluster experience to the users, simplifying lifecycle management of Kubernetes clusters. The guest cluster software stack absorbs the complexity of cluster creation, cluster upgrade, cluster integration with the supervisor cluster, and more, to provide a declarative cluster configuration interface to development teams.

The disclosed techniques also provide for logical separation of virtualized infrastructure management, cluster management, and application development. VI admins can enable supervisor clusters and create supervisor namespaces without extensive knowledge of Kubernetes. Developer/operator engineers can deploy and manage guest clusters within supervisor namespaces without extensive knowledge of the underlying virtualized infrastructure and its management. Application developers can deploy their applications on a guest cluster without extensive knowledge of Kubernetes cluster management or virtualized infrastructure.

The guest clusters and the underlying supervisor cluster share data for management and authorization purposes, as well as have expectations for how that data should be processed. This sharing of data and protocols for processing the data creates a contract between the supervisor cluster and the guest clusters that allows the supervisor cluster to manage the guest clusters. As discussed in detail below, the supervisor cluster includes core components and components for specifically managing the guest clusters. During upgrade of the core components or guest cluster specific components in the supervisor cluster, or the guest clusters themselves, the contract can be broken. Techniques described herein determine when a release of supervisor cluster software is compatible with releases of guest cluster software. The disclosed techniques employ a declarative approach, which relies on a set of metadata that specify the compatibility space for data objects and protocols. These and further advantages and aspects of the disclosed architecture are described below with respect to the drawings. Techniques for providing a supervisor cluster for supporting guest clusters are first described, followed by techniques for software compatibility checking.

Guest Clusters as Virtual Extensions of Supervisor Clusters

FIG. 1 is a block diagram of a virtualized computing system 100 in which embodiments may be implemented. System 100 includes a cluster 118 of hosts 120 that may be constructed on server-grade hardware platforms such as an x86 architecture platforms (also referred to as "host cluster 118"). As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a network 180. Network 180 is a physical network that enables communication between hosts 120 and between other components and hosts 120 (other components discussed further herein).

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170.

A software platform 124 of each host 120 provides a virtualization layer, referred to herein as a hypervisor 150, which directly executes on hardware platform 122. In an embodiment, there is no intervening software, such as a host OS, between hypervisor 150 and hardware platform 122. Thus, hypervisor 150 is a Type-1 hypervisor (also known as a "bare-metal" hypervisor) Hypervisor 150 abstracts processor, memory, storage, and network resources of hardware platform 122 to provide a virtual machine execution space within which multiple virtual machines (VM) may be concurrently instantiated and executed One example of hypervisor 150 that may be configured and used in embodiments described herein is a VMware ESXi™ hypervisor provided as part of the VMware vSphere® solution made commercially available by VMware, Inc. of Palo Alto, Calif. As shown in FIG. 1, VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of orchestration control plane 115 executing in hypervisor 150 (referred to as a pod VM controller). An example of pod VM 130 is described further below with respect to FIG. 2. Some native VMs 140 have specific functions within host cluster 118, such as control VMs 143 and support VMs 145. Control VMs 143 are VMs that implement control planes as described further herein. Support VMs 145 are VMs that are created by a control plane to support applications implemented using pod VMs 130 and/or native VMs 140. An embodiment of software platform 124 is discussed further below with respect to FIG. 2.

Software platform 124 is configured with software-defined (SD) networking 175. SD networking 175 includes a data plane having various logical components, such as routers, switches, gateways, firewalls, load balancers, and the like, coupled to form logical networks that overlay network 180. The terms "logical" and "virtual" are used interchangeably herein with respect to SD networking 175. SD networking 175 includes a control plane configured to manage the data plane Some components of the control and data planes are implemented as support VMs 145 (e.g., logical router control VMs, load balancers, edge gateways, etc.). Other components are implemented as part of hypervisor 150 (e.g., logical switches, logical routers, distributed firewalls, etc.).

VM management server 116 is a physical or virtual server that provisions pod VMs 130 and VMs 140 from the hardware resources of hosts 120. VM management server 116 installs a control plane agent 152 in hypervisor 150 to add a host 120 as a management entity. VM management server 116 logically groups hosts 120 into cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in the cluster may be one or many. Each host 120 in cluster 118 has access to shared storage 170 via network 180. VM management server 116 can also communicate with shared storage 170 via network 180 to perform control operations thereon.

In an embodiment, VM management server 116 includes a resource scheduler 108. Resource scheduler 108 is configured to aggregate the resources of host cluster 118 to provide resource pools and enforce resource allocation policies. Resource scheduler 108 also provides resource management in the form of load balancing, power management, VM placement, and the like.

In an embodiment, VM management server 116 further includes a supervisor cluster service 109. Supervisor cluster service 109 configures host cluster 118 to be part of a supervisor cluster 101. Supervisor cluster service 109 installs a control plane agent 152 in hypervisor 150 to add a host 120 to supervisor cluster 101. Supervisor cluster 101 integrates an orchestration control plane, such as Kubernetes, with host cluster 118. In embodiments, Kubernetes is described as the orchestration control plane for supervisor cluster 101. In supervisor cluster 101, hosts 120 become nodes for use by the orchestration control plane. Supervisor cluster service 109 provisions one or more virtual servers as "master servers" to manage the orchestration control plane. In the embodiment of FIG. 1, supervisor cluster 101 includes a supervisor Kubernetes master 104 that functions as a master server for an orchestration control plane 115 of supervisor cluster 101. For purposes of clarity, supervisor Kubernetes master 104 is shown as a separate logical entity. For implementations, supervisor Kubernetes master 104 can be implemented as a control VM 143 (an optionally pod VMs 130) in host cluster 118. Further, although only one supervisor Kubernetes master 104 is shown, supervisor cluster 101 can include more than one supervisor Kubernetes master 104. An embodiment of supervisor Kubernetes master 104 is described below with respect to FIG. 3.

In an embodiment, system 100 further includes storage manager 110. Storage manager 110 is a physical or virtual server that provisions virtual disks in shared storage 170 (or a vSAN formed from local storage 163) as independent objects. That is, virtual disks that persist apart from the lifecycle of any VM or container. Various components can interact with storage manager 110 to provision persistent storage, such as VM management server 116 and supervisor Kubernetes master 104. Storage manager 110 can operate independently from VM management server 116 (e.g., as an independent physical or virtual server). Alternatively, storage manager 110 can be a service in VM management server 116 (e.g., alongside components such as resource scheduler 108 and supervisor cluster service 109).

In an embodiment, system 100 further includes a network manager 112. Network manager 112 is a physical or virtual server that manages SD networking 175 for hosts 120. Network manager 112 can install a control plane agent 152 in hypervisor 150 to add a host 120 as a management entity. Network manager 112 configures host cluster 118 to be part of a transport zone 103. Transport zone 103 integrates logical networking control and data planes with host cluster 118. In transport zone 103, hosts 120 become transport nodes having shared logical networking resources. Network manager 112 can operate independently from VM management server 116 (e.g., as an independent physical or virtual server). Alternatively, network manager 112 can be a service of VM management server 116 (e.g., alongside components such as resource scheduler 108 and supervisor cluster service 109).

VM management server 116, network manager 112, and storage manager 110 comprise a virtual infrastructure (VI) control plane 113 for host cluster 118. In embodiments, one or more of VM management server 116, network manager 112, and storage manager 110 are implemented using control VM(s) 143. Alternatively, one or more of VM management server 116, network manager 112, and storage manager 110 can be external to host cluster 118.

In an embodiment, system 100 further includes an image registry 190 and a container repository 192. As described further herein, containers of supervisor cluster 101 execute in pod VMs 130. Containers are spun up from container images. Container images are registered with image registry 190, which manages a plurality of container repositories (one of which is shown in FIG. 1 as container repository 192) in which images of all containers registered with image registry 190 are stored. During registration of a container image, image registry 190 collects authentication information and during subsequent requests to access the registered container images, authenticates the requester using the collected authentication information. Once the requester is authenticated, image registry 190 permits the requester to fetch the container images registered to the requester.

In an embodiment, system 100 further includes a content library 194 and a repository of VM images 196. VM management server 116 can include a content library service 111 that cooperates with content library 194 to provision native VMs 140 using VM images 196. Each VM image 196 includes a guest operating system and guest software to implement some preconfigured functionality.

A VI administrator (VI admin) can interact with VM management server 116 through a VM management client 106. Through VM management client 106, a VI admin commands VM management server 116 to form host cluster 118, configure resource pools, resource allocation policies, and other cluster-level functions, configure storage and networking, and create supervisor cluster 101. VM admin can also interact with VM management server 116 to define supervisor namespaces 117. A supervisor namespace 117 provides resource constraints, authorization constraints, and policies (e.g., storage policies, network policies, etc.) Resource constraints can be expressed as quotas, limits, and the like with respect to compute (CPU and memory), storage, and networking of the virtualized infrastructure (host cluster 118, shared storage 170, SD networking 175). Authorization constraints include definitions of users, roles, privileges, bindings of roles to privileges, and the like. Each supervisor namespace 117 includes a portion within orchestration control plane 115, which allows users to provision applications in supervisor cluster 101 within the scope of supervisor namespaces 117.

Kubernetes client 102 represents an input interface for a developer/operator (hereinafter referred to as "DevOp") to supervisor Kubernetes master 104. Kubernetes client 102 is commonly referred to as kubectl. Through Kubernetes client 102, a DevOp submits desired states of the Kubernetes system, e.g., as YAML documents, to supervisor Kubernetes master 104. In embodiments, the DevOp submits the desired states within the scope of a supervisor namespace 117. In response, supervisor Kubernetes master 104 configures supervisor cluster 101 to match the desired state by creating pod VMs 130, creating native VMs 140, connecting VMs to storage and logical networks, destroying pod VMs 130 and native VMs 140, and the like. The resources are deployed within the confines of the supervisor namespace. In this manner, a DevOp interacts with supervisor Kubernetes master 104 to deploy applications in supervisor cluster 101 within defined supervisor namespaces 117. One such application, as described further below, is a container orchestration system referred to as a "guest cluster." For example, a guest cluster can be a Kubernetes cluster deployed as a virtual extension of supervisor cluster 101.

Figure 2:
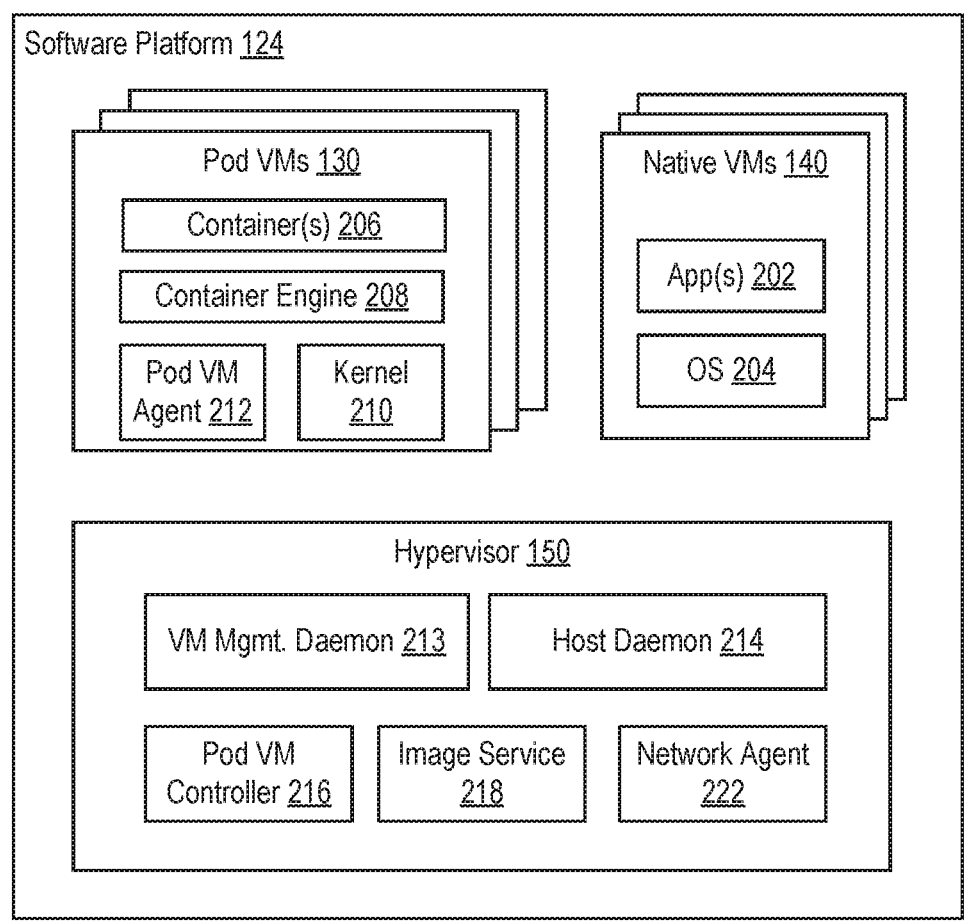
FIG. 2 is a block diagram depicting a software platform according an embodiment.

FIG. 2 is a block diagram depicting software platform 124 according an embodiment. As described above, software platform 124 of host 120 includes hypervisor 150 that supports execution of pod VMs 130 and native VMs 140. In an embodiment, hypervisor 150 includes a VM management daemon 213, a host daemon 214, a pod VM controller 216, an image service 218, and a network agent 222. VM management daemon 213 is a control plane agent 152 of VI control plane 113. VM management daemon 213 provides an interface to host daemon 214 for VM management server 116. Host daemon 214 is configured to create and destroy VMs (e.g., pod VMs 130 and native VMs 140).

Pod VM controller 216 is a control plane agent 152 of orchestration control plane 115 for supervisor cluster 101 and allows Kubernetes master 104 to interact with hypervisor 150. Pod VM controller 216 configures the respective host as a node in orchestration control plane 115. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured.

Image service 218 is configured to download and extract container images to shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images.

Network agent 222 comprises a control plane agent 152 of SD networking 175. Network agent 222 is configured to cooperate with network management and control planes (e.g., network manager 112) to implement logical network resources. Network agent 222 configures the respective host as a transport node in a transport zone managed by network manager 112.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd.

Each of containers 206 has a corresponding container image (CI) stored as a read-only virtual disk in shared storage 170. These read-only virtual disks are referred to herein as CI disks. Additionally, each pod VM 130 has a virtual disk provisioned in shared storage 170 for reads and writes. These read-write virtual disks are referred to herein as ephemeral disks. When a pod VM is deleted, its ephemeral disk is also deleted. In some embodiments, ephemeral disks can be stored on a local storage of a host because they are not shared by different hosts. Container volumes are used to preserve the state of containers beyond their lifetimes. Container volumes are stored in virtual disks of shared storage 170.

Figure 3:
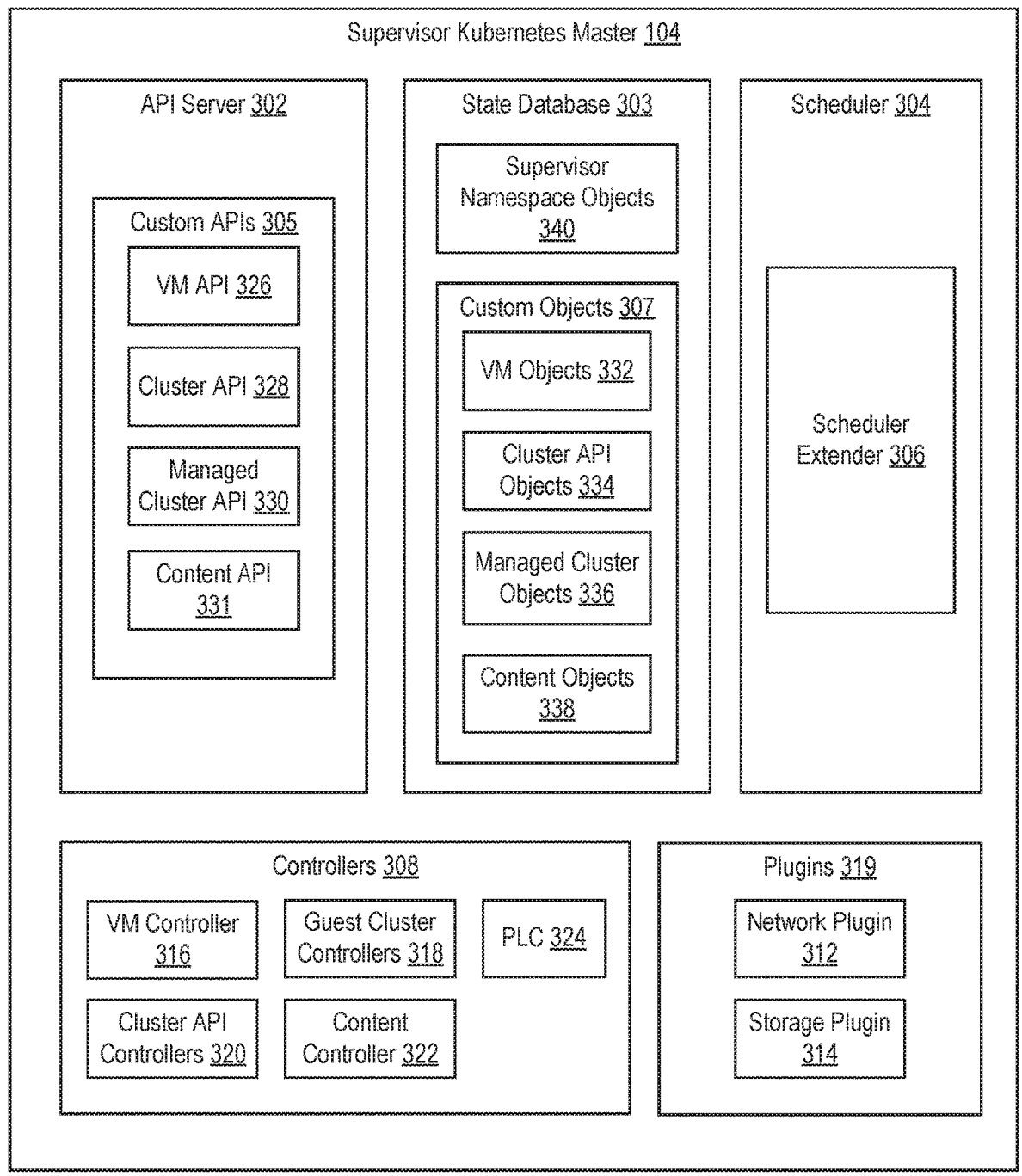
FIG. 3 is a block diagram of a supervisor Kubernetes master according to an embodiment.

FIG. 3 is a block diagram of supervisor Kubernetes master 104 according to an embodiment. Supervisor Kubernetes master 104 includes application programming interface (API) server 302, a state database 303, a scheduler 304, controllers 308, and plugins 319. Controllers 308 can include, for example, VM controller 316, guest cluster controllers 318, cluster application programming interface (API) controllers 320, content controller 322, and platform lifecycle controller (PLC) 324. Plugins 319 can include, for example, network plugin 312 and storage plugin 314.

API server 302 provides an API for use by Kubernetes client 102 (e.g., kube-apiserver). API server 302 is the front end of orchestration control plane 115. The Kubernetes API provides a declarative schema for creating, updating, deleting, and viewing objects. State database 303 stores the state of supervisor cluster 101 (e.g., etcd) as objects created by API server 302. A user can provide application specification data to API server 302 that defines various objects supported by the API (e.g., as a YAML document). The objects have specifications that represent the desired state. State database 303 stores the objects defined by application specification data as part of the supervisor cluster state.

Namespaces provide scope for Kubernetes objects. Namespaces are objects themselves maintained in state database 303. A namespace can include resource quotas, limit ranges, role bindings, and the like that are applied to objects declared within its scope. As described above, a VI admin cooperates with VM management server 116 to define supervisor namespaces 117 for supervisor cluster 101. A supervisor namespace 117 is a resource-constrained and authorization-constrained unit of multi-tenancy managed by VM management server 116. State database 303 stores supervisor namespace objects 340. VM management server 116 creates a supervisor namespace object 340 for each supervisor namespace 117, pushing down resource constraints and authorization constraints into orchestration control plane 115.

Scheduler 304 watches state database 303 for newly created pods with no assigned node. A pod is an object supported by API server 302 that is a group of one or more containers, with network and storage, and a specification on how to execute. Scheduler 304 selects candidate nodes in supervisor cluster 101 for pods. Scheduler 304 cooperates with scheduler extender 306, which interfaces with VM management server 116. Scheduler extender 306 cooperates with VM management server 116 (e.g., such as with resource scheduler 108) to select nodes from candidate sets of nodes and provide identities of hosts 120 corresponding to the selected nodes. For each pod, scheduler 304 also converts the pod specification to a pod VM specification, and scheduler extender 306 asks VM management server 116 to reserve a pod VM on the selected host 120. Scheduler 304 updates pods in state database 303 with host identifiers.

A controller 308 tracks objects in state database 303 of at least one resource type. Controller(s) 308 are responsible for making the current state of supervisor cluster 101 come closer to the desired state as stored in state database 303. A controller 308 can carry out action(s) by itself, send messages to API server 302 to have side effects, and/or interact with external systems. PLC 324 is responsible for tracking pods that have assigned nodes without pod VM identifiers. PLC 324 cooperates with VM management server 116 to commit reserved pod VMs for pods VM management server 116 returns a pod VM identifier to PLC 324, which in turn updates the pod in state database 303.

Pods are native objects of Kubernetes. The Kubernetes API can be extended with custom APIs 305 to allow orchestration and management of custom objects 307. A custom resource definition (CRD) can be used to define a custom object 307 to be handled by API server 302. Alternatively, an extension API server can be used to introduce a custom object 307 by API server aggregation, where the extension API server is fully responsible for the custom resource. A user interacts with custom APIs 305 of API server 302 to create custom objects 307 tracked in state database 303. A controller 308 is used to watch for and actuate on custom objects 307 declared in state database 303. In Kubernetes, a controller responsible for the lifecycle of custom resources is referred to as an "operator." However, the term controller will be used throughout this specification for consistency.

In an embodiment, orchestration control plane 115 is extended to support orchestration of native VMs, VM images, and guest clusters. This extensibility can be implemented using either CRDs or an extension API server in supervisor Kubernetes master 104. Custom APIs 305 include VM API 326, content API 331, Cluster API 328, and managed cluster API 330. A user or a controller 308 can invoke VM API 326 to create VM objects 332, which represent native VMs. A user or controller 308 can invoke content API 331 to create content objects 338, which represent VM images of guest software to execute in native VMs.

A user or a controller 308 can invoke Cluster API 328 to create Cluster API objects 334. Cluster API objects 334 include objects that represent a Kubernetes cluster. Cluster API objects 334 can include: (1) a Cluster object representing an entire Kubernetes cluster and capturing cluster-wide configuration; (2) a Machine object represent each control plane node and each worker node in the Cluster and capturing node-level configuration; (3) a MachineSet set object that maintains a number of identical machine objects representing worker nodes (e.g., similar to a ReplicaSet in Kubernetes); and (4) a MachineDeployment object that manages the rollout strategy for MachineSets (e.g., similar to how Deployment does for ReplicaSet in Kubernetes).

A user can invoke managed cluster API 330 to create managed cluster objects 336. A managed cluster object 336 defines a Kubernetes cluster at a higher level than Cluster API 328. For example, a managed cluster object 336 can be specified by a cluster name, version of Kubernetes to use, a storage class to apply to the control plane nodes, a number of worker nodes, and a storage class to apply to the worker nodes Other specifications for a managed cluster object 336 can be computed, inherited, or have default values.

Each of the custom objects 307 has a corresponding controller 308. VM controller 316 is configured to monitor state database 303 for creation of VM objects 332. VM controller 316 cooperates with VM management server 116, network manager 112, and/or storage manager 110 to deploy native VMs 140 to implement VM objects 332. VM controller 316 manages the lifecycle of native VMs 140 implementing VM objects 332. Content controller 322 is configured to monitor for content objects 338 and cooperate with VM management server 116 to deploy VM images 196 from content library 194 into native VMs 140. Cluster API controllers 320 are configured to monitor state database 303 for Cluster API objects 334. Cluster API controllers 320 invoke VM API 326 and content API 331 to create VM objects 332 and content objects 338 to cause deployment of native VMs 140 that implement the declared cluster. Guest cluster controllers 318 are configured to monitor state database 303 for creation of managed cluster objects 336. Guest cluster controllers 318 consume the specification of a managed cluster object 336 and invoke Cluster API 328 to define cluster API objects 334 that represent a cluster configured per the specification. VM controller 316, content controller 322, Cluster API controllers 320, and guest cluster controllers 318 also manage lifecycles of their respective objects.

Plugins 319 provide a well-defined interface to replace a set of functionality of the Kubernetes control plane. Network plugin 312 is responsible for configuration of logical networking of SD networking 175 to satisfy the needs of network-related resources. Network plugin 312 cooperates with VM management server 116 and/or network manager 112 to implement the appropriate logical network resources Storage plugin 314 is responsible for providing a standardized interface for persistent storage lifecycle and management to satisfy the needs of resources requiring persistent storage. Storage plugin 314 cooperates with VM management server 116 and/or storage manager 110 to implement the appropriate persistent storage volumes in shared storage 170.

Figure 4A:
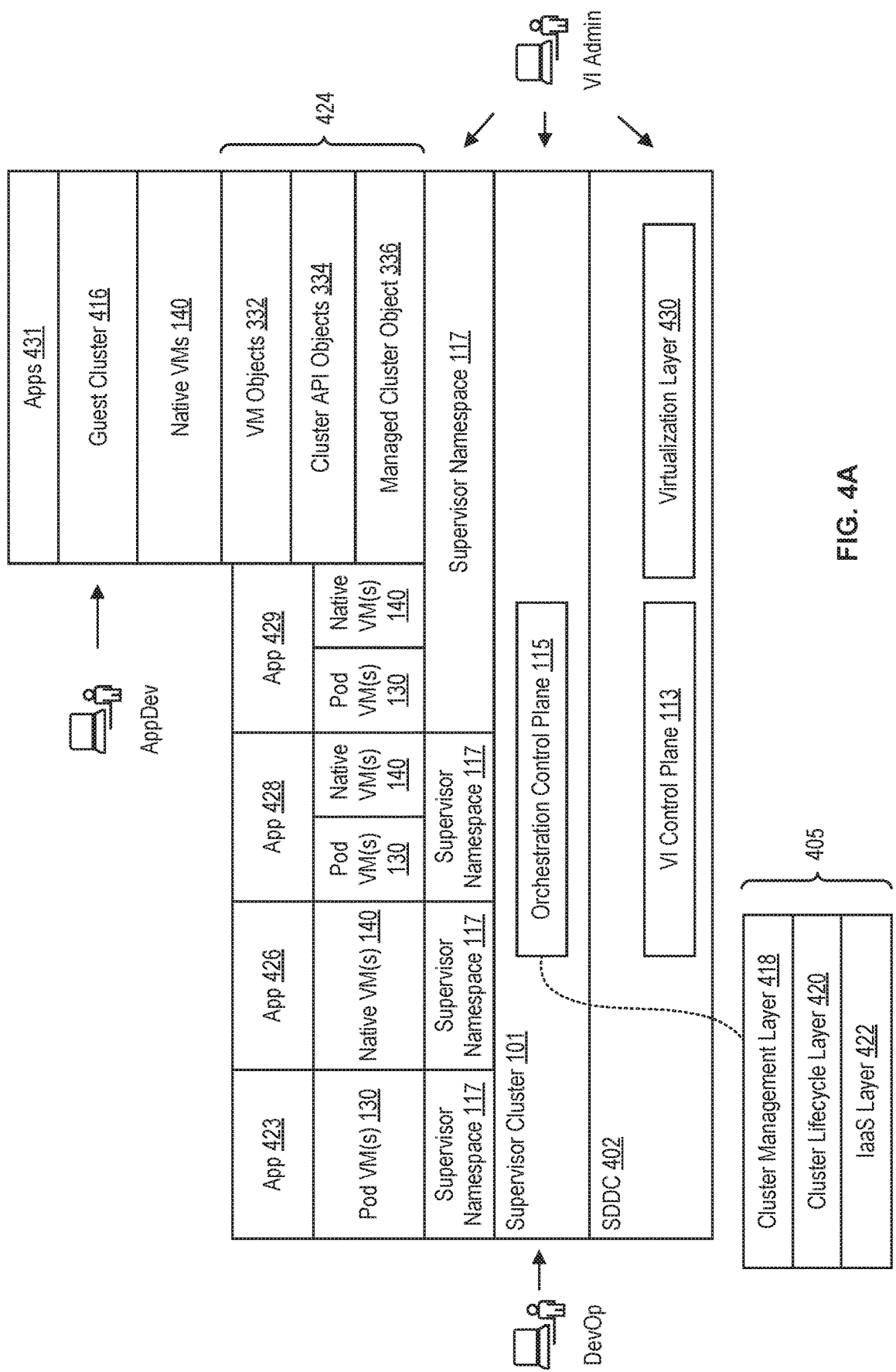
FIG. 4A is a block diagram depicting a guest cluster deployed as a virtual extension of a supervisor cluster alongside other applications according to an embodiment.

FIG. 4A is a block diagram depicting a guest cluster deployed as a virtual extension of a supervisor cluster alongside other applications according to an embodiment. Supervisor cluster 101 is implemented by a software-defined data center (SDDC) 402. SDDC 402 includes virtualized computing system 100 shown in FIG. 1, including host cluster 118, VM management server 116, network manager 112, storage manager 110, shared storage 170, and SD networking 175. SDDC 402 includes VI control plane 113 for managing a virtualization layer 430 of host cluster 118, along with shared storage 170 and SD networking 175. A VI admin interacts with VM management server 116 (and optionally network manager 112) of VI control plane 113 to configure SDDC 402 to implement supervisor cluster 101. Virtualization layer 430 comprises the hypervisors 150 of the constituent hosts in host cluster 118. Thus, the term "virtualization layer" as used herein encompasses both a hypervisor executing on a single host or multiple hypervisors executing on a cluster of hosts depending on the context (e.g., one host versus cluster or plurality of hosts).

Supervisor cluster 101 includes orchestration control plane 115, which includes supervisor Kubernetes master(s) 104 and pod VM controllers 216. The VI admin interacts with VM management server 116 to create supervisor namespaces 117. Each supervisor namespace 117 includes a resource pool and authorization constraints. The resource pool includes various resource constraints on supervisor namespace 117 (e.g., reservation, limits, and share (RLS) constraints). Authorization constraints provide for which roles are permitted to perform which operations in supervisor namespace 117 (e.g., allowing VI admin to create, manage access, allocate resources, view, and create objects; allowing DevOps to view and create objects; etc.). A DevOp interacts with Kubernetes master 104 to deploy applications on supervisor cluster 101 within scopes of supervisor namespaces 117. In the example, the DevOp deploys an application 423 on pod VM(s) 130, an application 426 on native VM(s) 140, an application 428 on both pod VM(s) 130 and native VM(s) 140, and an application 429 on pod VI(s) 130 and/or native VM(s) 140.

The DevOp also deploys guest cluster 416 on supervisor cluster 101 within a supervisor namespace 117. Guest cluster 416 is constrained by the authorization and resource policy applied by the supervisor namespace in which it is deployed. Guest cluster 416 can be deployed in supervisor namespace 117 along with other applications (e.g., application 429 executing on VI(s) 130/140). Guest cluster 416 supports execution of applications 431. Orchestration control plane 115 includes guest cluster infrastructure software (GCIS) 405 configured to realize guest cluster 416 as a virtual extension of supervisor cluster 101. GCIS 405 includes an Infrastructure-as-a-Service (IaaS) layer 422, a cluster lifecycle layer 420, and a cluster management layer 418.

IaaS layer 422 forms the foundation of GCIS 405 and provides a declarative interface for interacting with the underlying infrastructure in SDDC 402. IaaS layer 422 is responsible for creating VMs, attaching disks, provisioning network resources, etc. In an embodiment, IaaS layer 422 includes VM API 326, VM controller 316, content API 331, and content controller 322. IaaS layer 422 also propagates OS settings to guest cluster during runtime (e.g., hostname, network interface settings, etc.) using VM controller 316.

Cluster lifecycle layer 420 provides functionality for turning the provisioned infrastructure into a Kubernetes cluster. Cluster lifecycle layer 420 is responsible for installing and configuring Kubernetes as instructed to produce guest cluster 416. In an embodiment, cluster lifecycle layer 420 includes Cluster API 328 and cluster API controllers 320. Cluster lifecycle layer 420 also propagates Kubernetes settings to the control plane in guest cluster 416 during runtime (e.g., low level settings, such as those that would be provided by configuration files and command line arguments).

Cluster management layer 418 provides functionality for deciding how Kubernetes should be installed and configured as directed by the DevOp. In an embodiment, cluster management layer 418 includes managed cluster API 330 and guest cluster controllers 318. Cluster management layer 418 also propagates authorization constraints and policy information (e.g., storage policy, network policy, etc.) from into the control plane of guest cluster 416 (e.g., through a guest cluster controller 318) during runtime supervisor namespace 117.

The DevOp interacts with cluster management layer 418 through managed cluster API 330 to define a managed cluster object 336, which includes the specification for guest cluster 416. Once managed cluster object 336 is declared, cluster management layer 418 invokes cluster API 328 of cluster lifecycle layer 420 to create various Cluster API objects 334 that express the desired state of guest cluster 416. Cluster lifecycle layer 420 reacts to cluster API objects 334 to invoke declarative interfaces of IaaS layer 422 (VM API 326 and content API 331) to create VM objects 332 and associated content objects 338 (not explicitly shown in FIG. 4A). IaaS layer 422 reacts to VM objects 332 to invoke imperative APIs of VM management server 116 (and optionally network manager 112 and/or storage manager 110) to create and spin-up native VMs 140 having VM images installed therein that provide a fully conformant Kubernetes cluster as guest cluster 416. Managed cluster object 410, cluster API objects 412, and VM objects 414 are in a set of GCIS managed objects 424 that contains current state of guest cluster 416 and its underlying infrastructure. An application developer (AppDev) can interact with the Kubernetes control plane in guest cluster 416 to deploy various containerized applications.

Figure 4B:
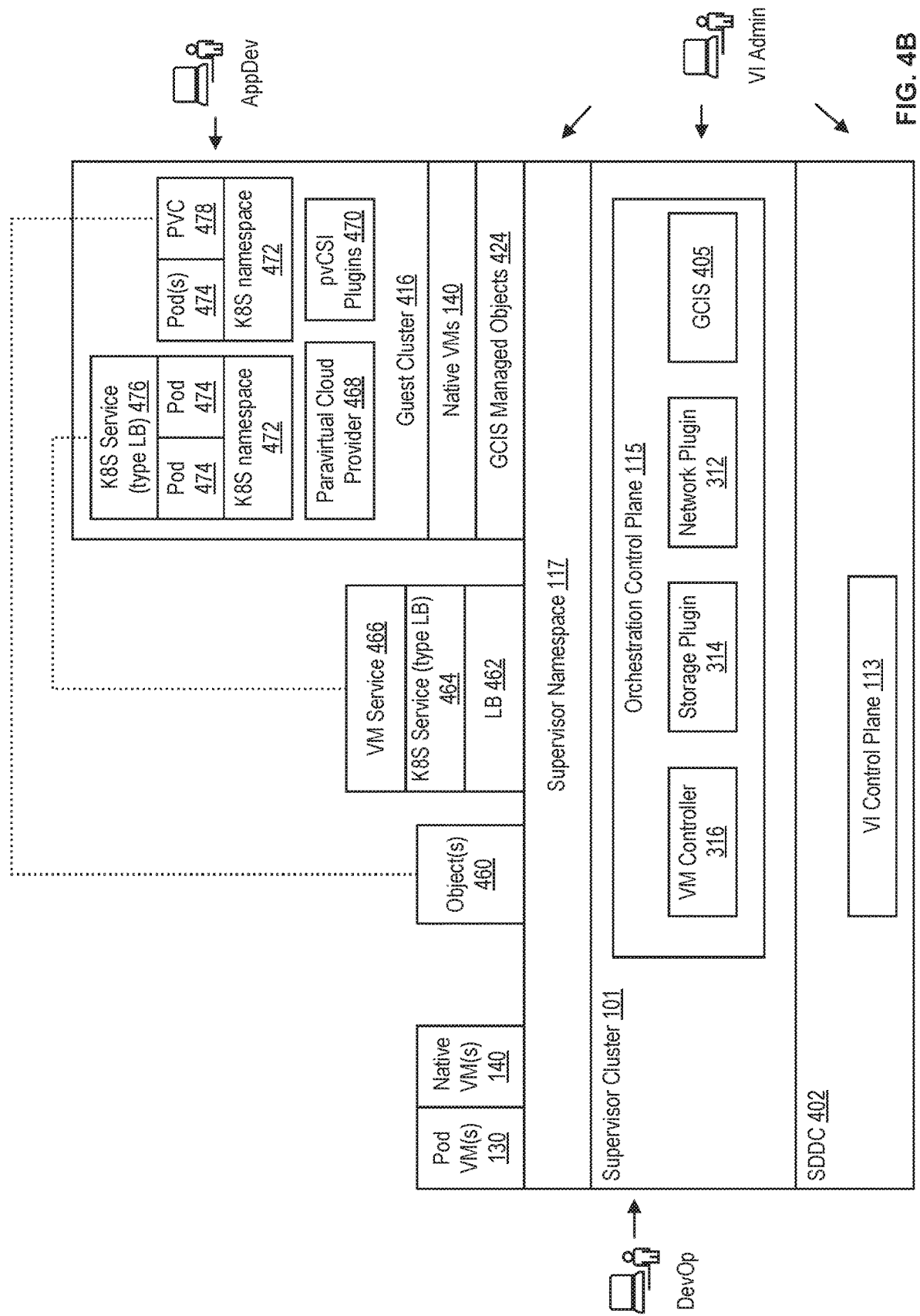
FIG. 4B is a block diagram depicting paravirtualization of network and storage resources for a guest cluster according to an embodiment.

FIG. 4B is a block diagram depicting paravirtualization of network and storage resources for a guest cluster according to an embodiment. As described further herein, guest cluster 416 includes control nodes and data nodes executing in native VMs 140. The nodes execute a paravirtual cloud provider 468 and paravirtual container storage interface (pvCSI) plugins 470. Developers interact with guest cluster 416 to create Kubernetes (K8S) namespaces 472 and deploy pods 474 in the K8S namespaces 472. As described further below, the nodes in guest cluster 416 also execute container network interface (CNI) plugins that are configured to provide network configuration for the containers in pods 474 per K8S namespace 472. Developers can deploy Kubernetes services on pods 474.

In embodiments, some services are paravirtualized, rather than being entirely managed and implemented within guest cluster 416 by the CNI plugins. For example, guest cluster 416 can include a K8S service 476 of service type Load-Balancer. Paravirtual cloud provider 468 monitors the Kubernetes control plane in guest cluster 416 for this service and, in response, interacts with API server 302 (FIG. 3) in orchestration control plane 115 to create a VM service 466. GCIS 405 monitors for VM service 466 and creates a K8S service 464 of type LoadBalancer in orchestration control plane 115. K8S service 464 in orchestration control plane 115 of supervisor cluster 101 backs K8S service 476 in guest cluster 416. Network plugin 312 monitors orchestration control plane 115 for K8S service 464 and cooperates with network manager 112 to orchestrate deployment of a load balancer (LB) 462 in SD networking 175.

A similar paravirtualization scheme can be used with persistent volume claims (PVCs). A PCV 478 can be defined in K8S namespace 472 in guest cluster 416 to provide persistent storage for pod(s) 474. The creation of PVC 478 is detected by a pvCSI plugin 470 in a control node of guest cluster 416, and pvCSI plugin 470 interacts with API server 302 in orchestration control plane 115 to create object(s) 460 in orchestration control plane 115 that results in storage plugin 314 taking action to satisfy PVC 478. In response to object(s) 406, storage plugin 314 cooperates with storage manager 110 to deploy persistent storage in shared storage 170 to satisfy the PVC 478.

Figure 5:
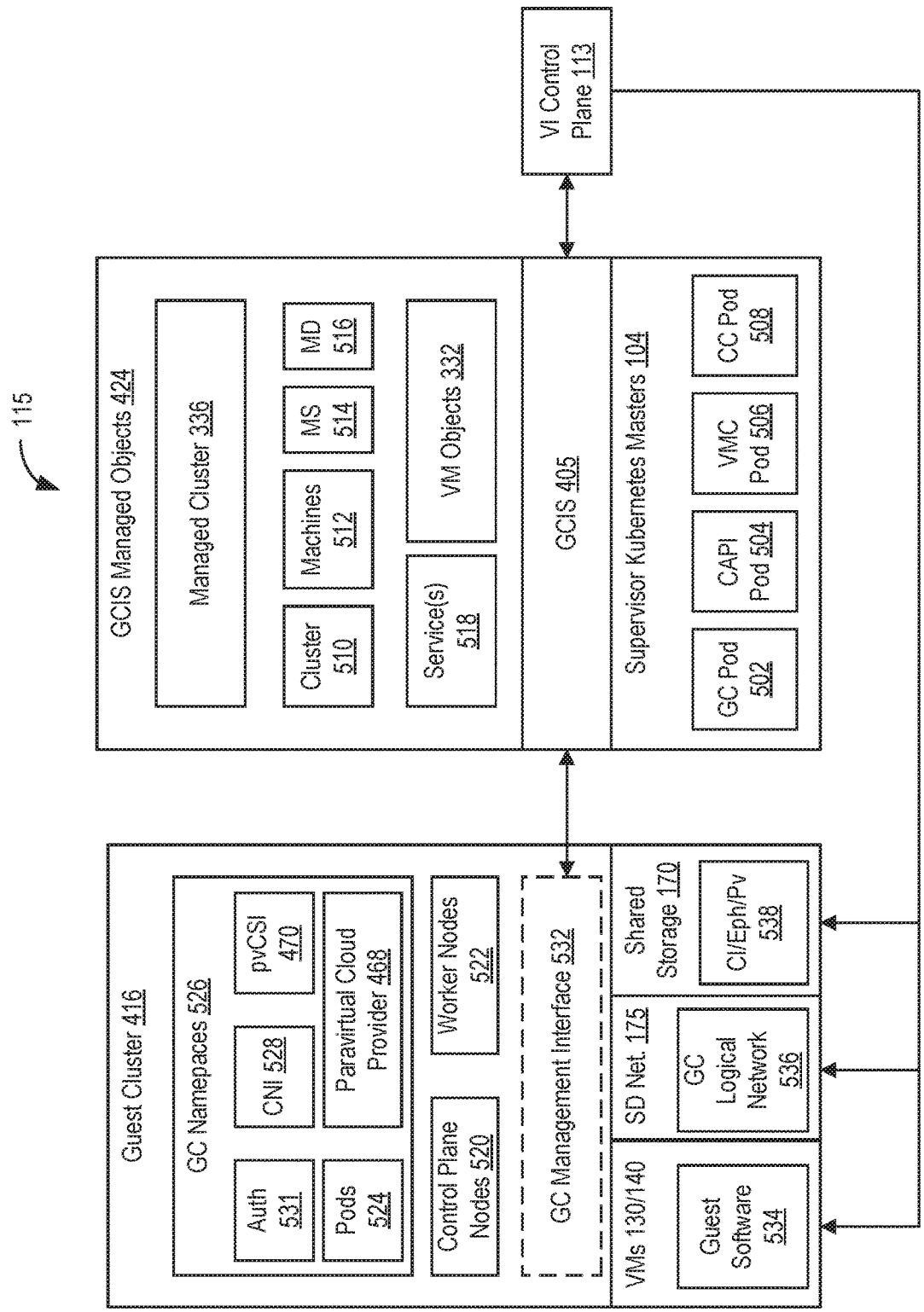
FIG. 5 is a block diagram depicting the interface between a guest cluster, orchestration control plane of the supervisor cluster, and the VI control plane according to an embodiment.

FIG. 5 is a block diagram depicting the interface between a guest cluster, orchestration control plane of the supervisor cluster, and the VI control plane according to an embodiment. Guest cluster 416 executes on infrastructure comprising VMs 130/140, SD networking 175, and shared storage 170. That infrastructure is managed by VI control plane 113 as discussed above. VMs 130/140 execute guest software 534 that implements the functionality of guest cluster 416. An example image of guest software 534 for a native VM 140 is described below with respect to FIG. 6. Guest software 534 for a pod VM 130 is described above with respect to FIG. 2. A pod VM 130 can be used to implement services of guest cluster 416 (e.g., within containers 206). SD networking 175 includes a guest cluster (GC) logical network 536, which includes logical switches, routers, and the like for guest cluster 416. Shared storage 170 includes container images, ephemeral disks, and persistent volumes (CI/Eph/Pv 538) for guest cluster 416.

In an embodiment, GCIS 405 executes on one or more supervisor Kubernetes masters 104. Supervisor Kubernetes master 104 can be implemented in a native VM 140 having a container engine therein. The controllers of GCIS 405 can be implemented in pods of containers executing on the container engine in native VM 140. For example, supervisor Kubernetes master 104 can include a guest cluster (GC) pod 502, a Cluster API (CAPI) pod 504, a VM controller (VMC) pod 506, and a content controller (CC) pod 508. GC pod 502 includes containers implementing guest cluster controllers 318. CAPI pod 504 includes containers implementing Cluster API controllers 320. VMC pod 506 includes containers implementing VM controller 316. CC pod 508 includes containers implementing content controller 322. In another embodiment, one or more of GC pod 502, CAPI pod 504, VMC pod 506, and CC pod 508 can be implemented in a pod VM 130 (as scheduled by supervisor Kubernetes master 104).

GCIS 405 manages a state stored by GCIS managed objects 424. GCIS managed objects 424 store the declared state of guest cluster 416. GCIS managed objects 424 include a managed cluster object 336, a cluster object 510, machine objects 512, a MachineSet (MS) object 514, a MachineDeployment (MD) object 516, service objects 518, and VM objects 332. Managed cluster 336 and VM objects 332 are discussed above. Cluster 410, machines 512, MS 514, and MD 516 are types of Cluster API objects 334. Services 518 represent guest cluster services 416 (if any), which can be implemented in pod VMs 130.

Guest cluster 416 includes control plane nodes 520 and worker nodes 522. Control plane nodes 520 and worker nodes 522 are implemented using native VMs 140. Control nodes 520 implement the Kubernetes control plane for guest cluster 416 ("GC Kubernetes control plane"). The GC Kubernetes control plane includes GC namespaces 526 (also referred to as K8S namespaces) An application developer interacts with the GC Kubernetes control plane to deploy pods 524 on worker nodes 522. GC namespaces 526 can include one or more system namespaces having system components, including a container network interface (CNI) plugins 528, paravirtual cloud provider 428, pvCSI plugins 470, and authorization proxy 531 (shown as "Auth"). CNI plugins 528 execute in control plane nodes 520 and worker nodes 522 and configure GC logical network 536 for guest cluster 416. In an embodiment, CNI plugins 528 cooperate with network plugin 312 in supervisor Kubernetes master 104 to configure GC logical network 536. That is, CNI plugins 528 do not directly interface with VI control plane 113, but rather interface with VI control plane 113 through network plugin 312. In another embodiment, CNI plugins 528 directly interface with VI control plane 113 (e.g., network manager 112). In another embodiment, CNI plugins 528 orchestrate GC logical network 536 entirely within guest cluster 416 with the exception of paravirtualized services, such as the K8S load balancing service discussed in FIG. 4B. Paravirtual cloud provider 468 functions to paravirtualiztion one or more K8S services as discussed above. CSI 530 configures storage resources (e.g., persistent volumes) for guest cluster 416. The pvCSI plugins 470 attach/detach and create/delete persistent volumes for guest cluster 416 in response to PVCs. In an embodiment, pvCSI plugins 470 calls APIs on supervisor Kubernetes master 104 to create object(s) that are managed by storage plugin 314. That is, pvCSI plugins 470 do not directly interface with VI control plane 113, but rather interfaces with VI control plane 113 through storage plugin 314. In another embodiment, pvCSI plugins 470 directly interface with VI control plane 113 (e.g., storage manager 110). Authorization proxy 531 is configured to validate user credentials against a public signing key provided by VM management server 116.

GCIS 405 cooperates with VI control plane 113 to deploy guest cluster 416 on the virtual infrastructure consistent with the state of GCIS managed objects 424. GCIS 405 further cooperates with VI control plane 113 for lifecycle management of the virtual infrastructure underlying guest cluster 416 in response to any updates to the state of GCIS management objects 424 (e.g., destroying guest cluster 416). GCIS 405 also cooperates with software in guest cluster 416 referred to as a GC management interface 532. GC management interface 532 is a collection of components, including paravirtual cloud provider 468, CNI plugins 528, pvCSI plugins 470, and bootstrap software executing on control plane nodes 520 (discussed further below). GCIS 405 cooperates with GC management interface 532 to provide configurations and settings to guest software 534, as well as to support the above-described communication between CNI plugins 528 and network plugin 312, and between pvCSI plugins 470 and storage plugin 314. In this manner, GCIS 405 isolates guest cluster 416 from VI control plane 113, which concurrently managing guest cluster 416 as a virtual extension of the underlying virtual infrastructure (e.g., host cluster 118, shared storage 170, SD networking 175).

Figure 6:
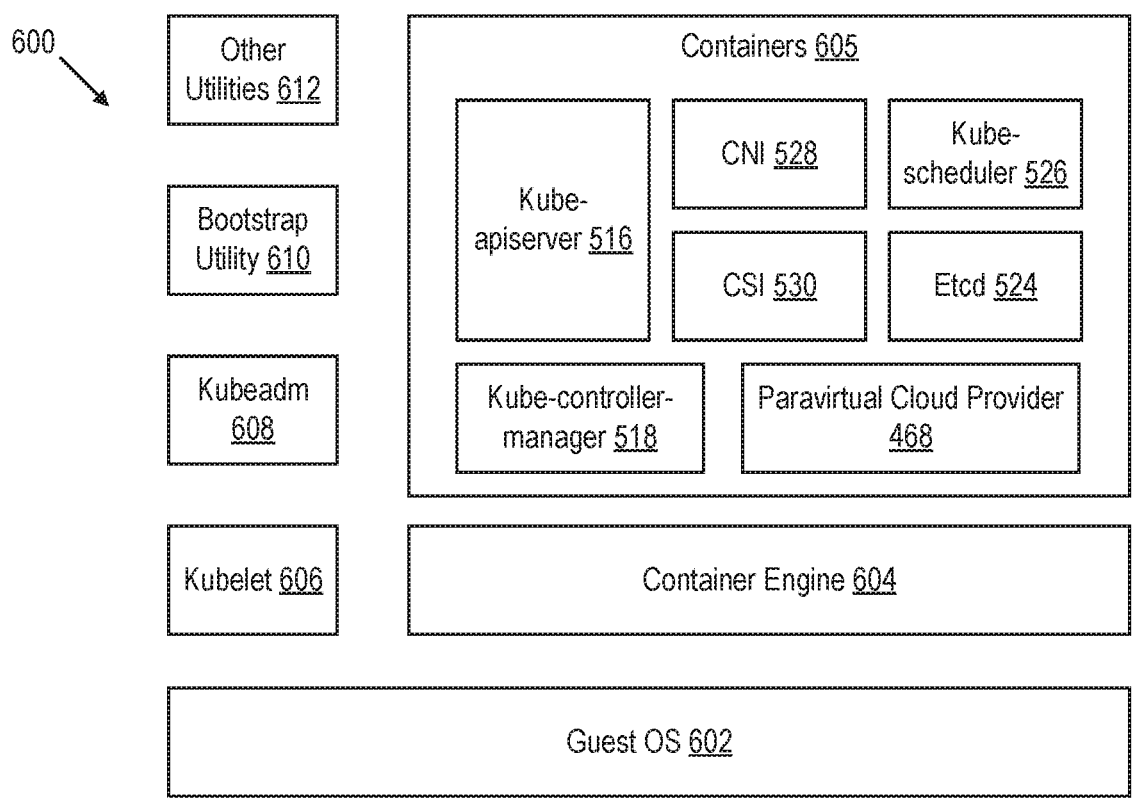
FIG. 6 is a block diagram depicting a VM image for implementing control plane nodes and worker nodes in a guest cluster according to an embodiment.

FIG. 6 is a block diagram depicting a VM image 600 for implementing control plane nodes and worker nodes in a guest cluster according to an embodiment. VM image 600 can be provisioned to native VMs 140 that supervisor cluster 101 has deployed for hosting guest cluster 416. VM image 600 comprises a guest OS 602, a container engine 604, a kubelet 606, a kubeadm 608, a bootstrap utility 610, and various other utilities 612. Guest OS 602 comprises a kernel and associated user space software (e.g., a Linux kernel and systemd). Kubelet 606 is the Kubernetes node agent and responsible for orchestrating pod execution. Kubeadm 608 is a utility to initialize a Kubernetes cluster and join nodes to the Kubernetes cluster. Bootstrap utility 610 provides an interface for GCIS 405 to configure settings in the control nodes and worker nodes. For example, GCIS 405 can pass configuration data to guest OS 602 and/or kubeadm 608 through bootstrap utility 610. Other utilities 612 can include various daemons and tools, such as sshd, ntpd, open-vm-tools, etc.

Container engine 604 supports execution of containers 605. Pre-configured containers on VM image 600 include a CNI plugin 528, kube-apiserver 616, kube-scheduler 626, pvCSI plugins 470, etcd 624, and kube-controller-manager 618. Kube-apiserver 616 is configured to expose the Kubernetes API and manage resource declarations and persistence in cooperation with etcd 624. Kube-scheduler 626 is configured to assign nodes to pods Kube-controller-manager 618 is configured to execute core Kubernetes controllers uses to manage core API resources. Etcd 624 is configured to manage the storage of declared objects and state. CNI plugin 528 is configured to configure logical networking for the node. The pvCSI plugins 470 include a node plugin for interacting with container engine 604 to mount volumes, and a controller plugin to provide lifecycle management of persistent volumes Paravirtual cloud provider 468 is configured to cooperate with GCIS 405 to configure logical networking for paravirtualized services, such as K8S load balancing services.

Figure 7:
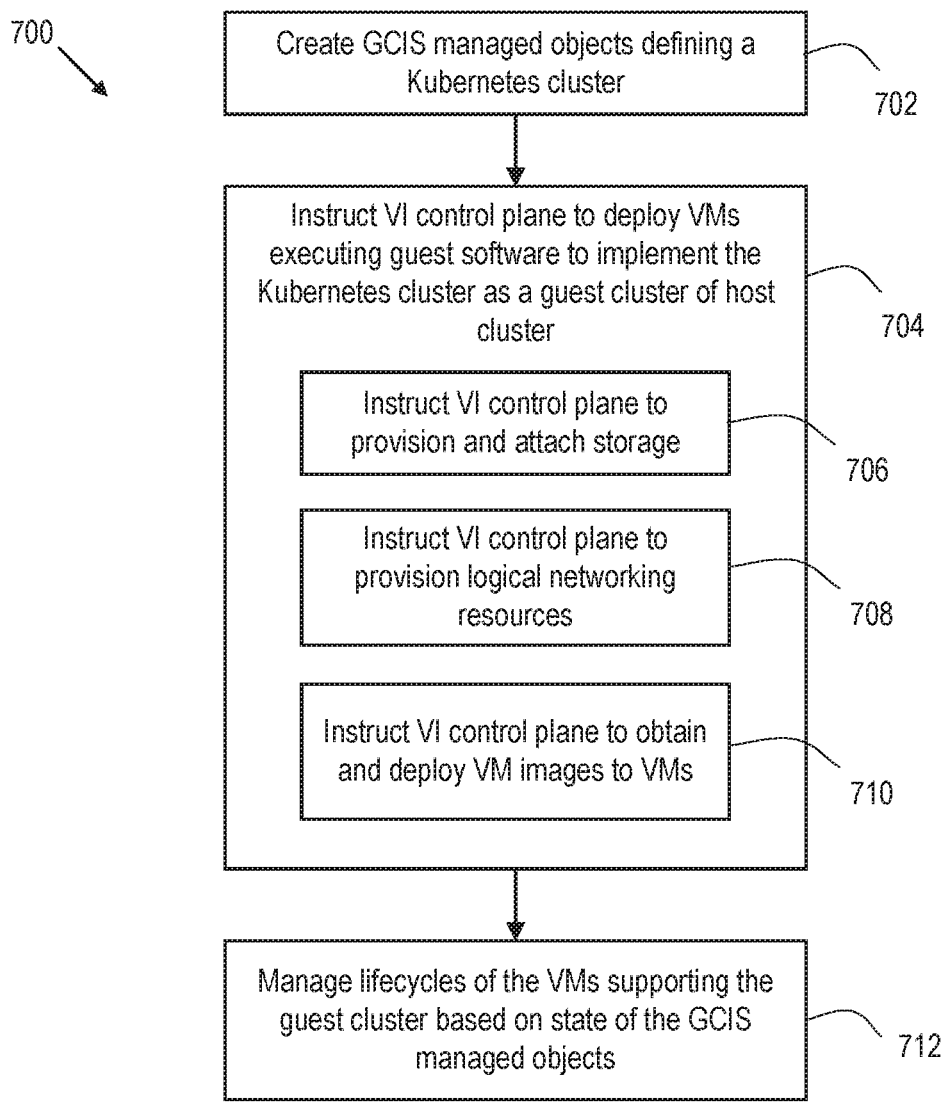
FIG. 7 is a flow diagram depicting a method of deploying a guest cluster as a virtual extension of a host cluster in a virtualized computing system according to an embodiment.

FIG. 7 is a flow diagram depicting a method 700 of deploying a guest cluster as a virtual extension of a host cluster in a virtualized computing system according to an embodiment. Method 700 can be performed by GCIS 405, which comprises software executing on CPU, memory, storage, and network resources managed by a virtualization layer (e.g., a hypervisor). Method begins at step 702, where GCIS creates GCIS managed objects 424 defining a Kubernetes cluster. GCIS managed objects 424 are created in layers by cluster management layer 418, the cluster lifecycle layer 420, and the IaaS layer 422 of GCIS 405.

At step 704, GCIS 405 instructs VI control plane 113 to deploy VMs 130/140 executing guest software 534 to implement the Kubernetes cluster as guest cluster 416 on supervisor cluster 101. In an embodiment, VM controller 316 reacts to the state of GCIS management objects 424 and cooperates with VM management server 116 to deploy native VMs 140. As part of the VM deployment, at step 706, GCIS 405 instructs VI control plane 113 to provision and attach storage resources to the deployed VMs (e.g., through interaction between VM controller 316 and storage manager 110). At step 708, GCIS 405 instructs VI control plane 113 to provision logical networking resources for the deployed VMs (e.g., through interaction between VM controller 316 and network manager 114) At step 710, GCIS 405 instructs VI control plane 113 to obtain and deploy VM images to the deployed VMs (e.g., through interaction between content controller 322 and VM management server 116). At step 712, GCIS 405 manages lifecycles of the deployed VMs supporting the guest cluster based on state of GCIS managed objects 424.

Figure 8:
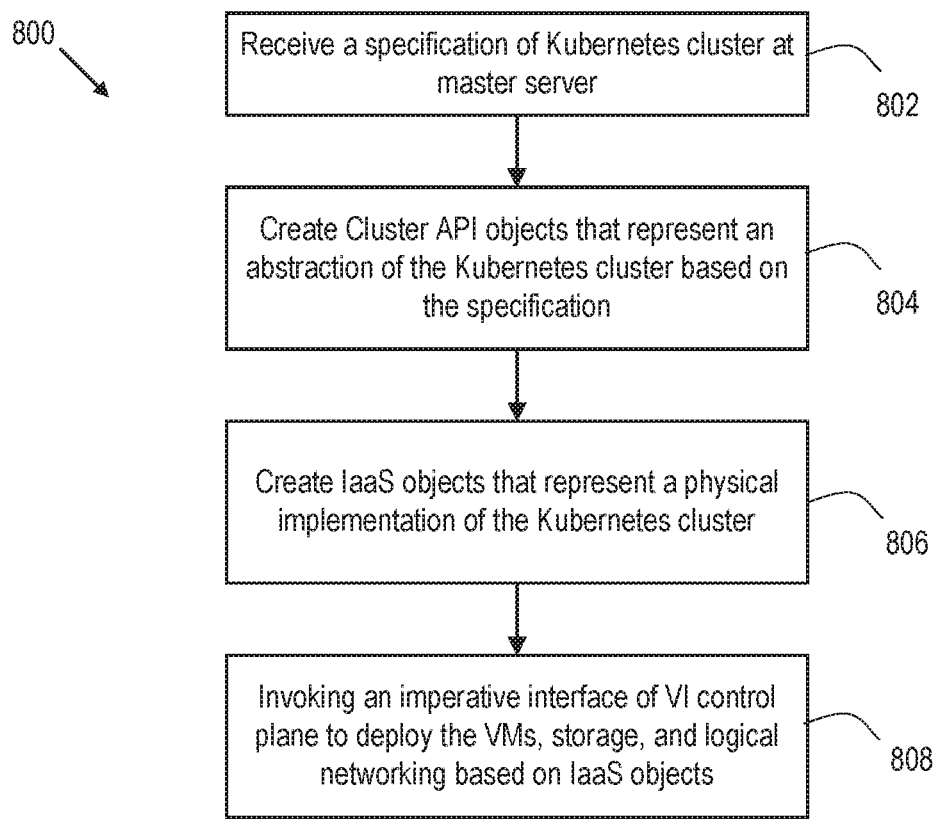
FIG. 8 is a flow diagram depicting a method of creating objects representing a guest cluster to be deployed as an extension of a host cluster according to an embodiment.

FIG. 8 is a flow diagram depicting a method 800 of creating objects representing a guest cluster to be deployed as an extension of a host cluster according to an embodiment. Method 800 can be performed by API server 302 and GCIS 405, which comprise software executing on CPU, memory, storage, and network resources managed by a virtualization layer (e.g., a hypervisor). Method 800 begins at step 802, API server 302 receives a specification of a Kubernetes cluster from a user. In response to the specification, API server 302 creates a managed cluster object 336. At step 804, cluster management layer 418 of GCIS 405 creates Cluster API objects 334 that represent an abstraction of the Kubernetes cluster based on the specification. In embodiments, guest cluster controllers 318 consume the specification of managed cluster object 336 and create cluster 510, machines 512, machine set 514, and machine deployment 516 representing the declared Kubernetes cluster. At step 806, cluster lifecycle layer 420 creates IaaS objects that represent a physical implementation of the Kubernetes cluster described by the abstract representation. In embodiments, cluster API controllers 320 consume the specifications of the created Cluster API objects to create VM objects 332, optionally services 518, content objects 338, and any other IaaS objects (e.g., source resources, networking resources, etc.). At step 808, IaaS layer 422 of GCIS 405 consumes the specifications of the IaaS objects and invokes an imperative interface of VI control plane to deploy VMs, storage, and logical networking. In embodiments, VM controller 316 cooperates with VM management server 116 to deploy the VMs, cooperates with storage manager 110 to provision storage, and cooperates with network manager 114 to provision logical networking. Content controller 322 cooperates with VM management server 116 to provision VM images to the VMs.

Figure 9:
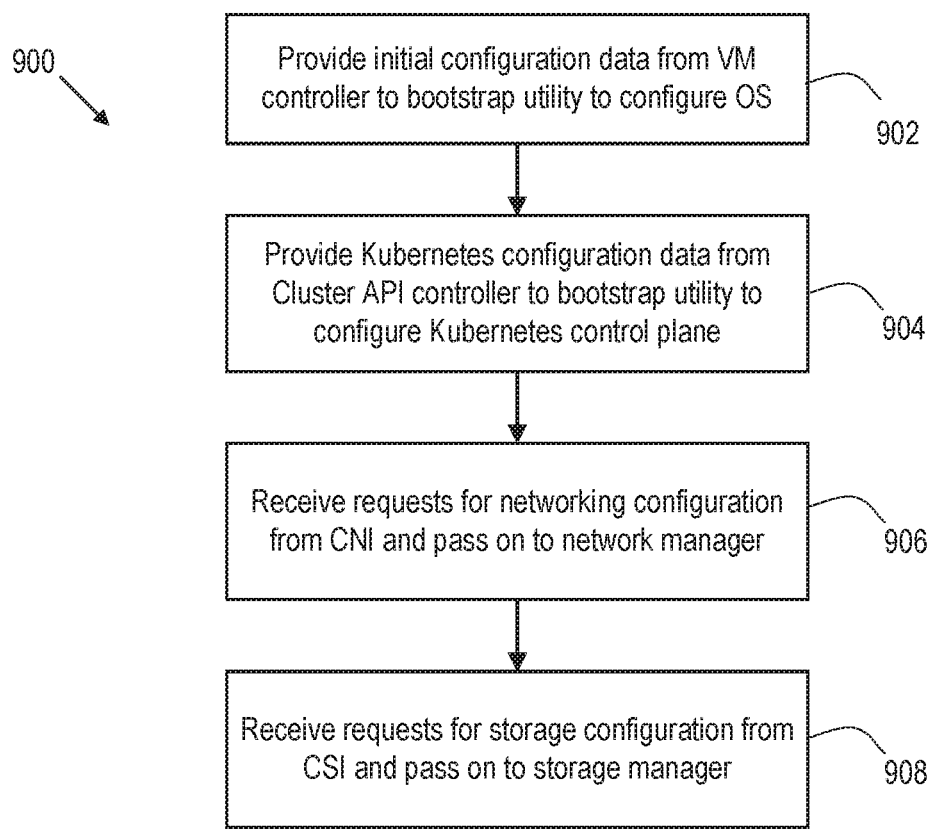
FIG. 9 is a flow diagram depicting a method of configuring a guest cluster according to an embodiment.

FIG. 9 is a flow diagram depicting a method 900 of configuring a guest cluster according to an embodiment. Method 900 can be performed by GCIS 405, which comprises software executing on CPU, memory, storage, and network resources managed by a virtualization layer (e.g., a hypervisor). Method 900 begins at step 902, where GCIS 405 provides initial configuration data from VM controller 316 to bootstrap utility 610 to configure guest OS 602. Initial configuration data can include hostname, network identities, and the like. At step 904, GCIS 405 provides Kubernetes configuration data from cluster API controllers 320 to bootstrap utility 610 to configure the Kubernetes control plane of in guest cluster 416 (as implemented by control plane nodes 520). Kubernetes configuration data can include configuration files and/or command line settings uses to initialize the control plane. At step 906, GCIS 405, through network plugin 312, receives requests from CNI plugin 528 for networking configuration. Network plugin 312 functions as a proxy and passes the requests on to network manager 114. At step 908, GCIS 405, through storage plugin 314, receives requests from pvCSI plugin 470 for storage configuration. Storage plugin 314 functions as a proxy and passes the requests on to storage manager 110.

Techniques for providing a guest cluster deployed as a virtual extension of a management cluster executing on a virtualized computing system have been described. The techniques allow a Kubernetes cluster to execute as a guest cluster that is a virtual extension of an underlying supervisor cluster. The supervisor cluster manages the configuration and lifecycle of the guest cluster via components running in the supervisor cluster. The guest cluster is deployed within a supervisor namespace, which provides resource constraints, authorization constraints, and policies defined with respect to the virtualized infrastructure. Deployment of the guest cluster in the supervisor namespace preserves the resource constraints, authorization constraints, and policies of the underlying supervisor namespace. In general, guest clusters inherit the configuration and policy from the underlying supervisor namespace. This provides a mechanism for setting hierarchical policy, e.g., policy can be applied to a supervisor namespace, which can in turn be applied to each guest cluster. The guest cluster to be created, re-sized, and deleted by an appropriately authorized user without a dependency or interaction with a VI admin, within the bounds of the supervisor namespace constraints. Lifecycle operations can be performed without access to the user interface or API surface of the VI control plane. Application developers can interact with the guest cluster to deploy applications without requiring knowledge of the underlying virtualized infrastructure.

Software Compatibility Checking for Managed Clusters

Figure 10:
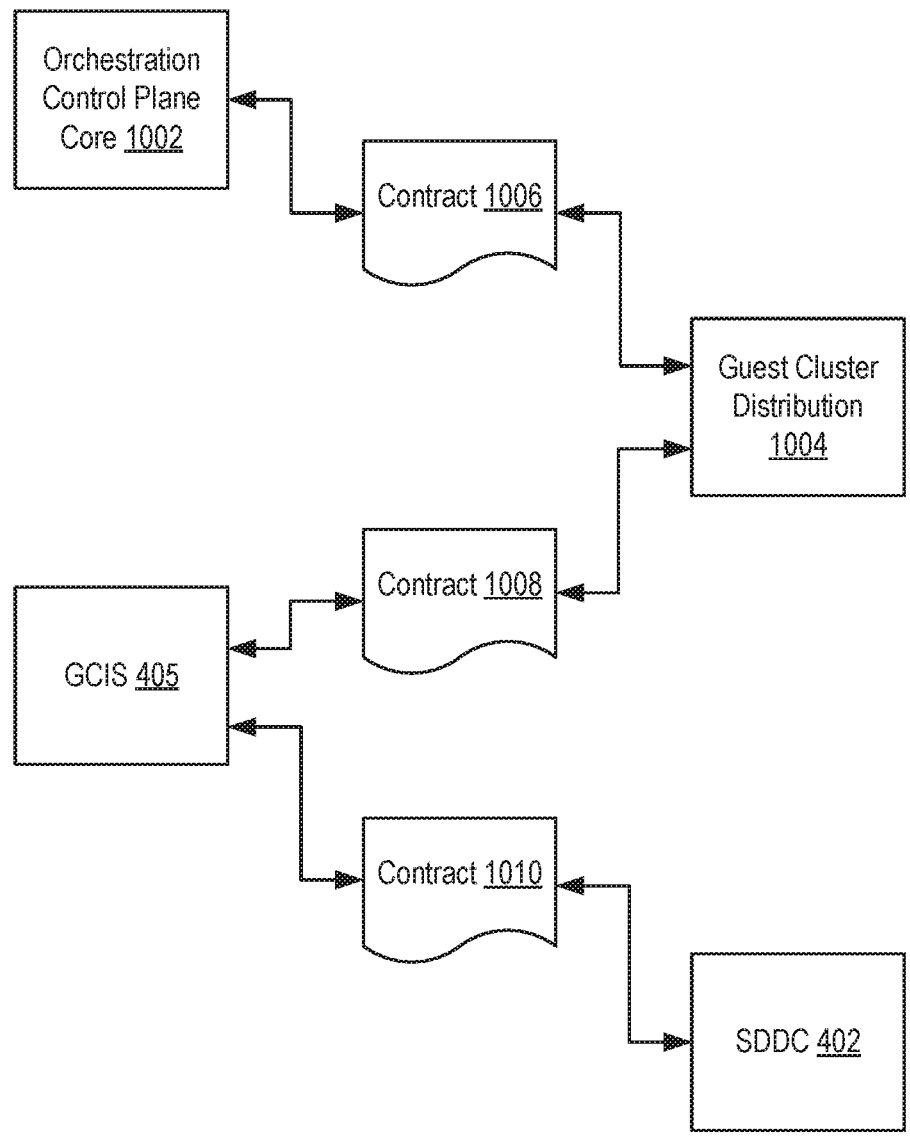
FIG. 10 is a block diagram depicting contracts between components in a virtualized computing system according to an embodiment.

FIG. 10 is a block diagram depicting contracts between components in a virtualized computing system according to an embodiment. Orchestration control plane core 1002 includes non-GCIS components, such as API server 302, scheduler 304 with scheduler extender 306, network plugin 312, storage plugin 314, etc. Orchestration control plane core 1002 includes a contract 1006 with each guest cluster distribution 1004. A guest cluster distribution 1004 is a specific version of VM image 600 for the control and worker nodes of a guest cluster. GCIS 405 includes a contract 1008 with each guest cluster distribution 1004. GCIS 405 includes a contract 1010 with SDDC 402. Each contract 1006, 1008, 1010 represents sharing of data and protocols between the supervisor cluster and the guest clusters, and between the SDDC and the supervisor cluster, that allows the supervisor cluster to manage the guest clusters.

Figure 11:
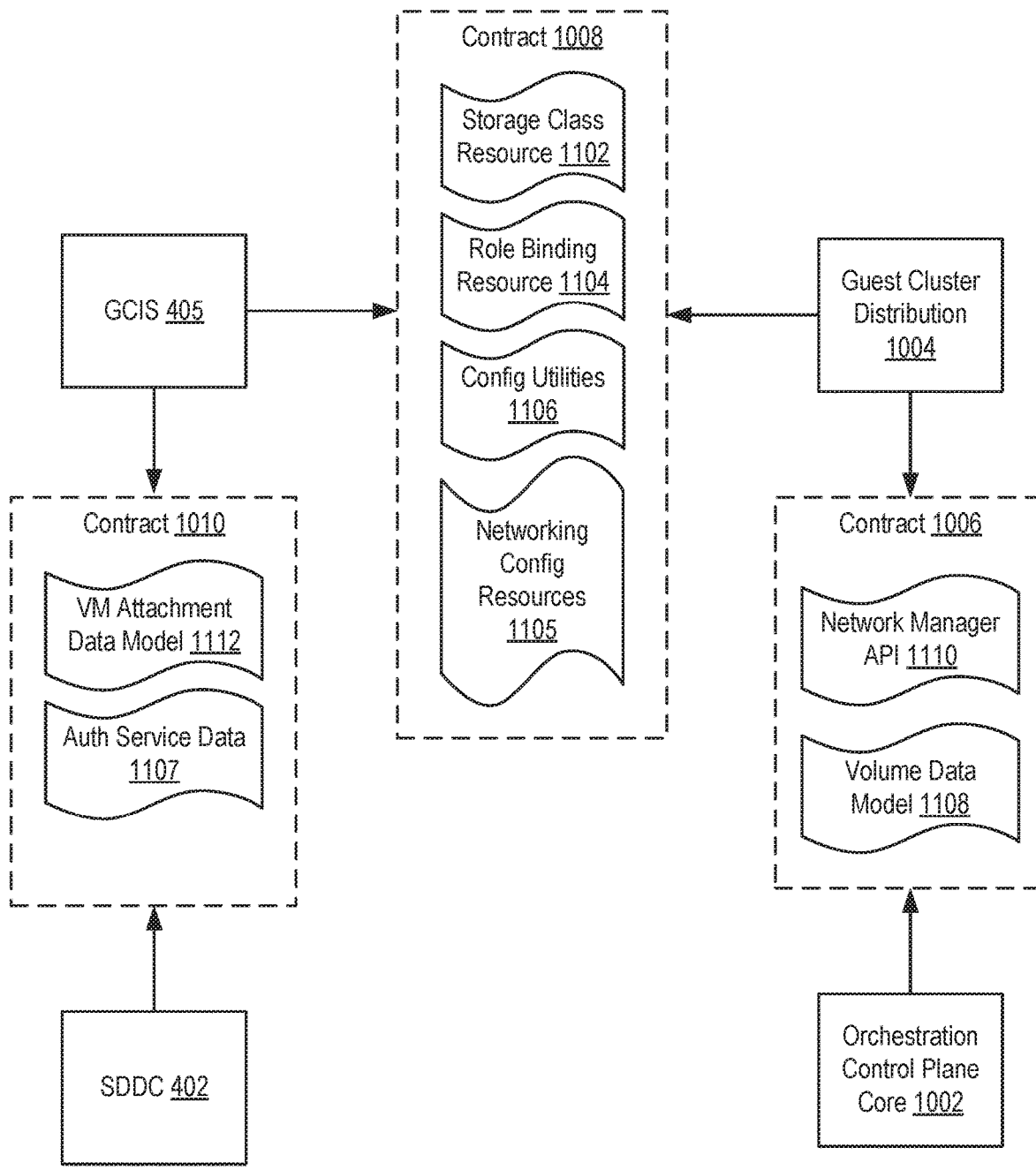
FIG. 11 is a block diagram depicting examples of the contracts shown in FIG. 10 according to an embodiment.

FIG. 11 is a block diagram depicting examples of the contracts shown in FIG. 10 according to an embodiment. The contract contents shown in FIG. 11 are just some examples of the dependencies between components in the virtualized computing system. Contract 1010 between GCIS 405 and SDDC 402 can include a VM attachment data model 1112 and auth service data 1107. VM attachment data model 1112 describes data and protocol exchanged between VM controller 316 and storage manager 110 for attaching persistent volumes to VMs. Auth service data 1107 describes the credential token format used by the single sign-on (SSO) platform of SDDC 402 to authenticate users, which is processed by auth service 531 in a guest cluster when authenticating users. Contract 1006 between each guest cluster distribution 1004 and orchestration control plane core 1002 can include network manager API 1110 and volume data model 1108. Network manager API 1110 is the interface of network manager 112 that components use to deploy and configure logical network resources of SD networking 175. In embodiments, CNI plugins 528 in guest cluster 416 invoke network API 1110 using network plugin 312 as a proxy. Thus, CNI plugins 528 and network plugin 312 should agree on network manager API 1110 so that network plugin 312 can properly proxy for CNI plugins 528. In embodiments, pvCSI plugins 470 in guest cluster 416 invoke storage manager 110 to provision persistent volumes using storage plugin 314 as a proxy. Thus, pvCSI plugins 470 and storage plugin 314 should agree on the data model and protocol for deploying persistent volumes using storage manager 110 so that storage plugin 314 can properly proxy for pvCSI plugins 530.

Contract 1008 between GCIS 405 and each guest cluster distribution 1004 can include storage class resource model 1102, role binding resource model 1104, configuration utilities 1106, and network config resources 1105. GCIS 405 reflects storage classes and role bindings of orchestration control plane 115 into the Kubernetes control plane of guest cluster 416. The version of GCIS 405 and the version of the Kubernetes control plane in guest cluster 416 should agree on the data models and protocols for this reflection of storage classes and role bindings. Further, GCIS 405 invokes configuration utilities 1106 in guest cluster 416, such as bootstrap utility 610 and kubeadm 608, for configuring the Kubernetes control plane and guest OS 602 of guest cluster 416 GCIS 405 should support the versions of configuration utilities 1106 executing in guest cluster 416 in order to perform its configuration thereof. Paravirtual cloud provider 468 creates objects managed by GCIS 405 (e.g., VM service 466) for paravirtualized services in the guest cluster.

Figure 12:
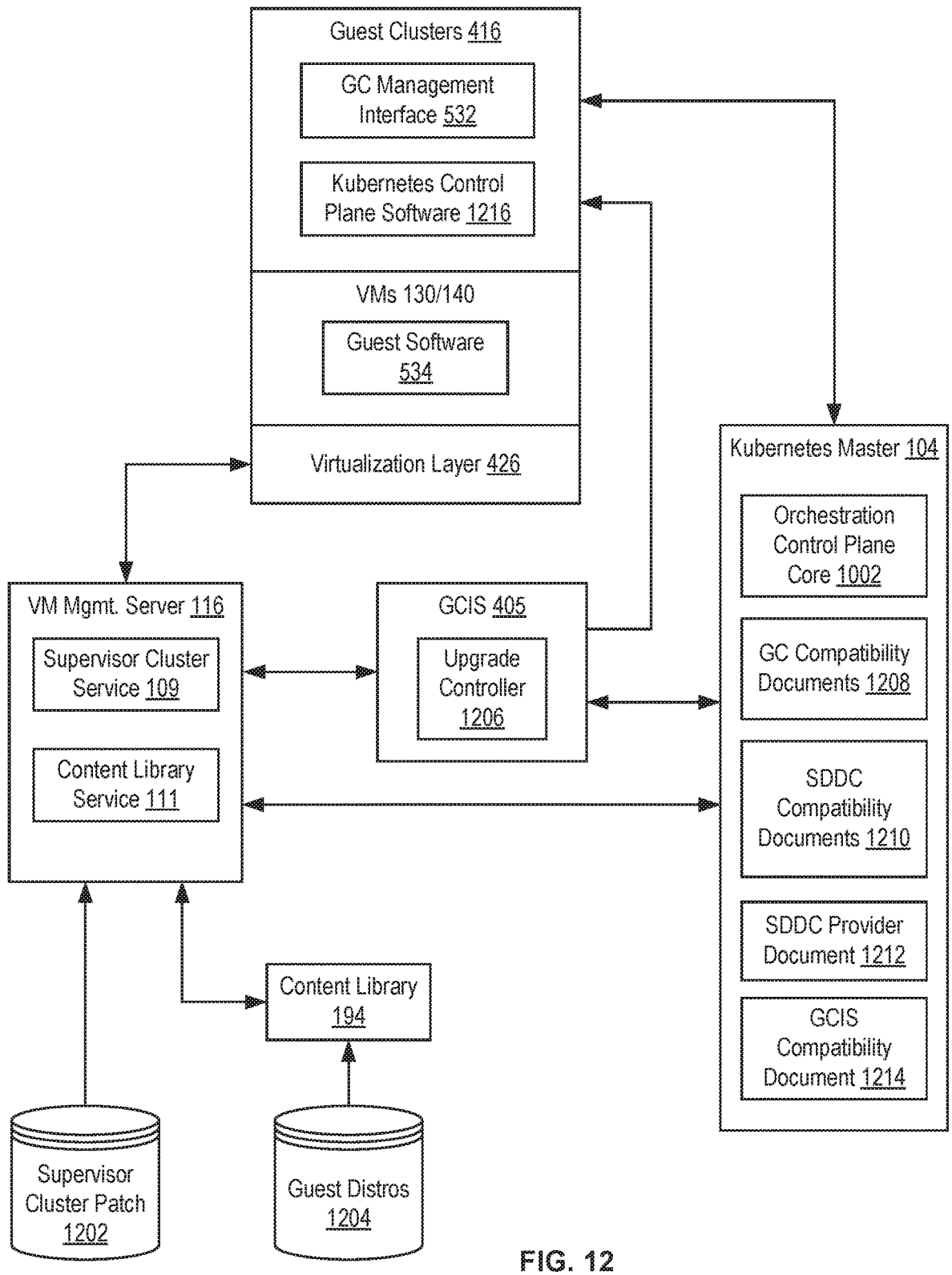
FIG. 12 is a block diagram depicting a logical view of guest clusters executing on virtualized infrastructure as managed by VI and orchestration control planes according to an embodiment.

FIG. 12 is a block diagram depicting a logical view of guest clusters executing on virtualized infrastructure as managed by VI and orchestration control planes according to an embodiment. VM management server 116 communicates with GCIS 405 and Kubernetes master 104. VM management server 116 further communicates with virtualization layer 430 to deploy VMs 130/140, and content library 194 to receive VM images, including guest distributions (guest distros 1204). Each guest distro 1204 can be a specific version of guest software 534, which results in a specific version of Kubernetes control plane software 1216 and GC management interface 532 within a guest cluster 416. Kubernetes master 104 includes orchestration control plane core 1002 and communicates with guest clusters 416 through GC management interface 532. GCIS 405 also communicates with guest clusters 416 through GC management interface 532. GCIS includes an upgrade controller 1206. Upgrade controller 1206 is configured to perform software compatibility checking and software upgrading of GCIS 405. While shown as a logically separate entity, GCIS 405 can be part of Kubernetes master 104, as described above.

To assist in software compatibility checking by upgrade controller 1206, Kubernetes master 104 maintains a set of metadata, which includes guest cluster (GC) compatibility documents 1208, SDDC compatibility documents 1210, SDDC provider document 1212, and GCIS compatibility document 1214. Each SDDC compatibility document 1210 provides versions and capabilities of the compatibility contracts that underlying SDDC 402 offers to, and requires from, GCIS 405. Each GC compatibility document 1208 provides versions and capabilities of the compatibility contracts guest distros 1204 offer to, and required from, GCIS 405. GCIS compatibility document 1214 provides versions and capabilities of the compatibility contracts GCIS 405 offers to, and requires from, a guest distro 1204 SDDC provider document 1212 specifies the current underlying SDDC layer and provides an aid to finding the correct compatibility offering for the SDDC (in general, more than one SDDC architecture can exist).

A VI admin can interact with VM management server 116 to obtain a supervisor cluster patch 1202. Supervisor cluster patch 1202 includes an upgrade of orchestration control plane 115, including orchestration control plane core 1002 and GCIS 405. Supervisor cluster patch 1202 includes a GCIS compatibility document 1214 for the patched version of orchestration control plane 115. Supervisor cluster service 109 cooperates with upgrade controller 1206 to perform GCIS software compatibility check and GCIS software upgrade workflows, which are discussed below. The results of the compatibility check and upgrade provide indications of which guest clusters 416 are unsupported by the patched version of orchestration control plane 115. The software compatibility metadata in Kubernetes master 104 is provided through SDDC upgrade, supervisor cluster creation, and guest distro receipt workflows, which are discussed below. During guest cluster creation, GCIS 405 associates a GC compatibility document 1208 for the particular version of the guest cluster with the managed cluster object 336. Further, during upgrade of a guest cluster to a new version, GCIS 405 updates the GC compatibility document associated with managed cluster object 336 to the target distribution.

Figure 13A:
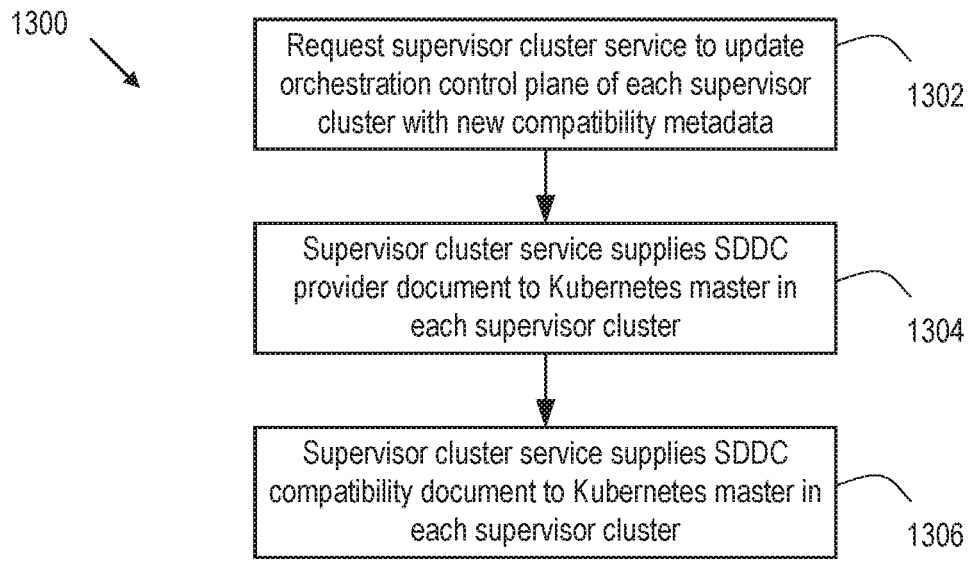
FIG. 13A is a flow diagram depicting a method of supplying compatibility metadata to supervisor clusters during an upgrade of the SDDC according to an embodiment.

FIG. 13A is a flow diagram depicting a method 1300 of supplying compatibility metadata to supervisor clusters during an upgrade of the SDDC according to an embodiment. Method 1300 can be performed by VM management server 116, which comprises software executing on CPU, memory, storage, and network resources managed by a virtualization layer (e.g., a hypervisor) or host operating system. Method 1300 begins at step 1302, where VM management server 116 requests supervisor cluster service 109 to update orchestration control plane 115 of each supervisor cluster 101 managed by VM management server 116. At step 1304, supervisor cluster service 109 supplies an SDDC provider document 1212 for the upgraded version of the SDDC to Kubernetes master 104 in each supervisor cluster 101. At step 1306, supervisor cluster service 109 supplies an SDDC compatibility document 1210 to Kubernetes master in each supervisor cluster 101.

Figure 13B:
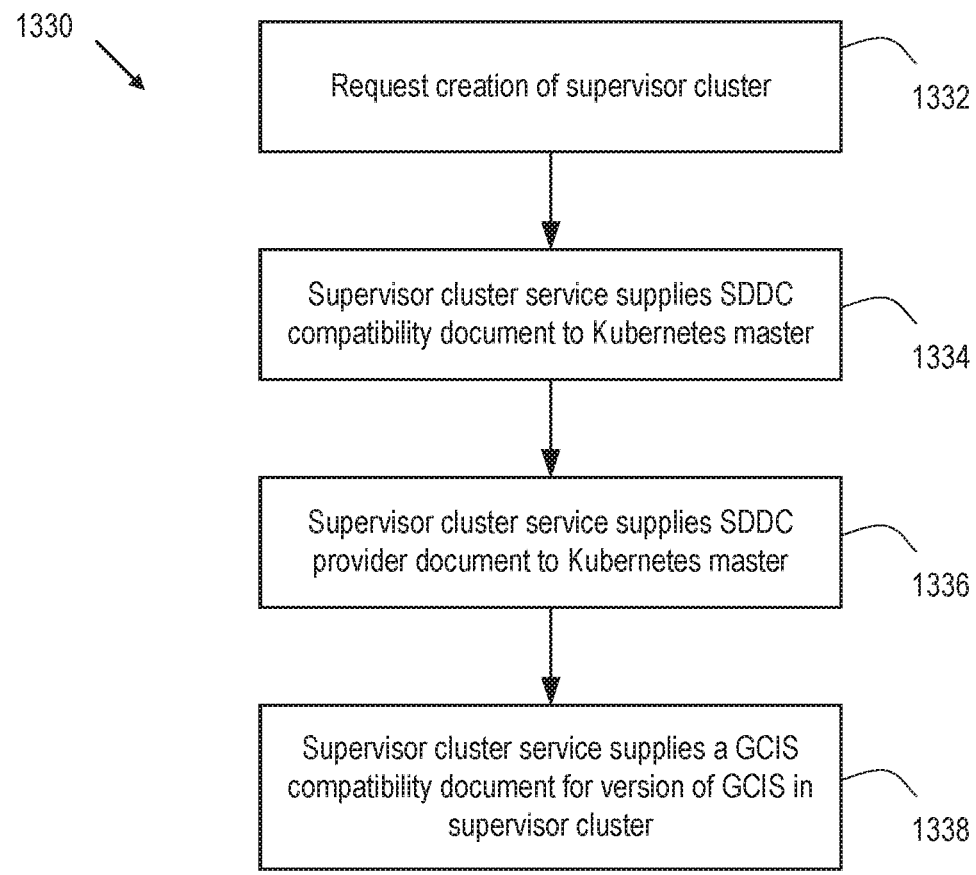
FIG. 13B is a flow diagram depicting a method of supplying compatibility metadata to a newly created supervisor cluster according to an embodiment.

FIG. 13B is a flow diagram depicting a method 1330 of supplying compatibility metadata to a newly created supervisor cluster according to an embodiment. Method 1330 can be performed by VM management server 116, which comprises software executing on CPU, memory, storage, and network resources managed by a virtualization layer (e.g., a hypervisor) or host operating system. Method 1330 begins at step 1302, where a VI admin interacts with VM management server 116 to create a supervisor cluster 101 on a host cluster 118 (e.g., by deploying orchestration control plane 115, as discussed above). At step 1334, supervisor cluster service 109 supplies an SDDC compatibility document 1210 to Kubernetes master 104 in supervisor cluster 101. At step 1336, supervisor cluster service 109 supplies an SDDC provider document 1212 to Kubernetes master 104 in supervisor cluster 101. At step 1338, supervisor cluster service 109 supplies a GCIS compatibility document 1214 for the version of GCIS 405 in supervisor cluster 101.

Figure 13C:
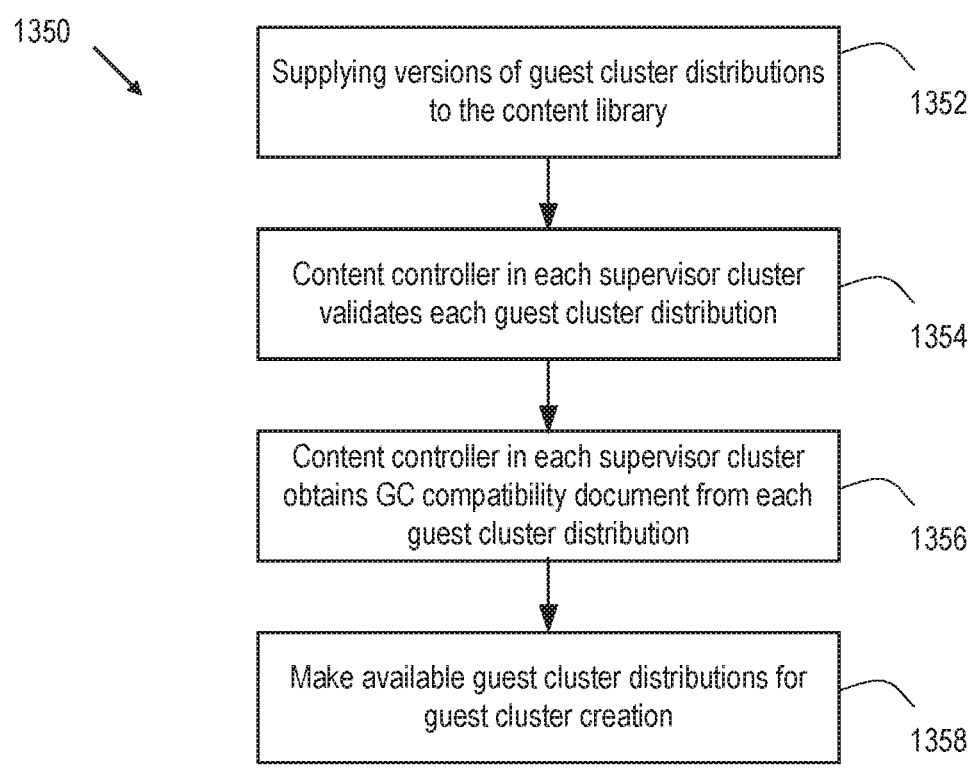
FIG. 13C is a flow diagram depicting a method of obtaining compatibility metadata from guest cluster distributions according to an embodiment.

FIG. 13C is a flow diagram depicting a method 1350 of obtaining compatibility metadata from guest cluster distributions according to an embodiment Method 1350 can be performed by GCIS 405 and/or Kubernetes master 104, which comprise software executing on CPU, memory, storage, and network resources managed by a virtualization layer (e.g., a hypervisor). Method 1350 begins at step 1352, where content library 194 receives new versions of guest cluster distributions 1204. At step 1354, content controller 322 in each supervisor cluster 101 validates each guest cluster distribution (e.g., by performing signature validation and other checks to ensure validity). Content controller 322 can discover the new guest cluster distributions from content library service 111 in VM management server 116. At step 1356, content controller 322 in each supervisor cluster 101 obtains a GC compatibility document 1208 from each guest cluster distribution 1204. At step 1358, content controller 322 in each supervisor cluster 101 makes available the guest cluster distributions for guest cluster creation and/or upgrade. That is, the guest cluster distributions are exposed as content objects 338 for use by content API 331.

Figure 14:
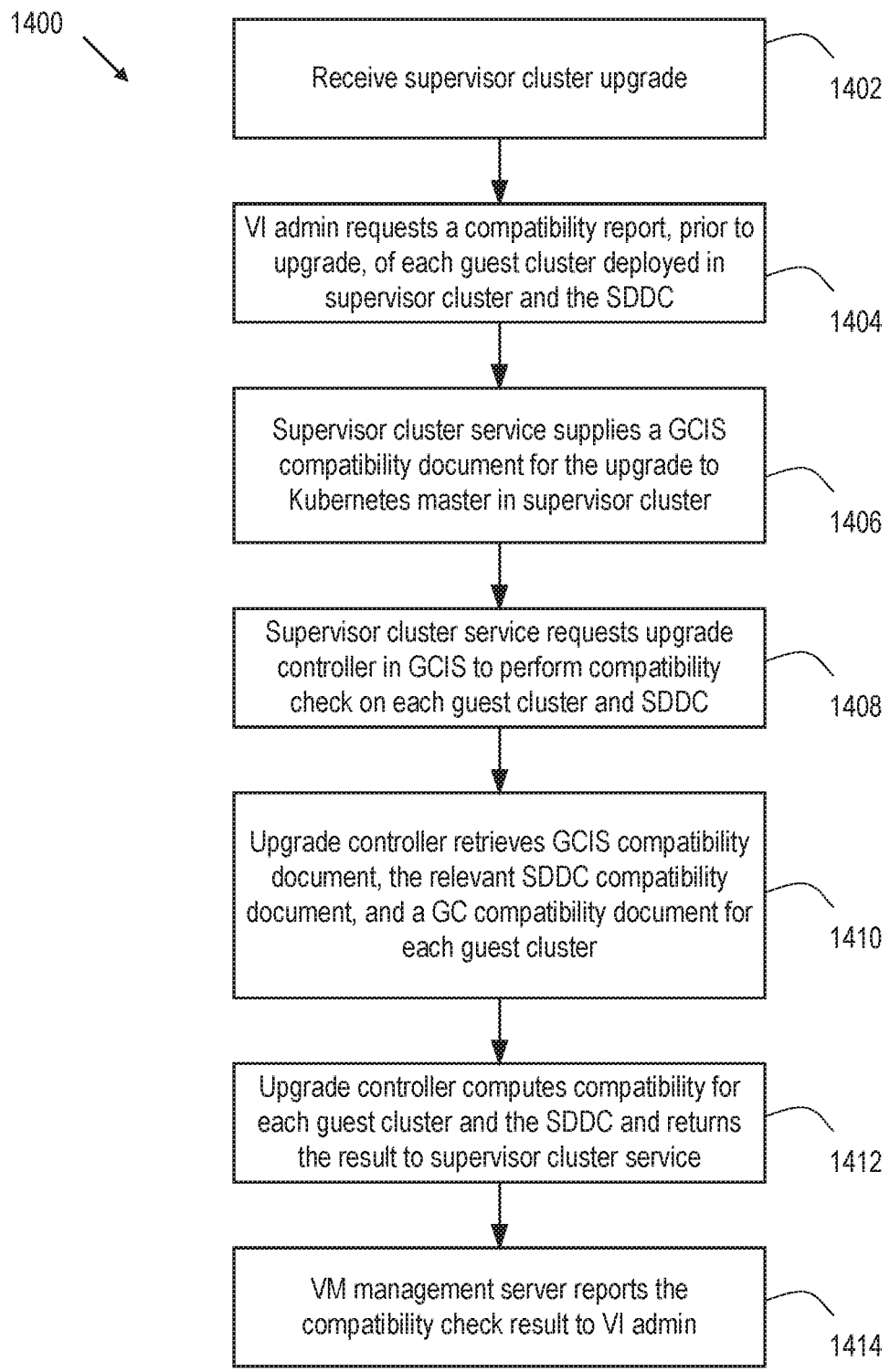
FIG. 14 is a flow diagram depicting a method of performing a software compatibility check prior to upgrading the orchestration control plane of a supervisor cluster according to an embodiment.

FIG. 14 is a flow diagram depicting a method 1400 of performing a software compatibility check prior to upgrading the orchestration control plane of a supervisor cluster according to an embodiment. Method 1400 can be performed by VM management server 116 and GCIS 405 and/or Kubernetes master 104, which comprise software executing on CPU, memory, storage, and network resources managed by a virtualization layer (e.g., a hypervisor) or host operating system. Method 1400 begins at step 1402, where VM management server 116 receives supervisor cluster patch 1202 as an upgrade for supervisor cluster 101. At step 1404, a VI admin interacts with VM management server 116 to request a compatibility report, prior to the upgrade operation, for each guest cluster deployed in the supervisor cluster and for the SDDC. At step 1406, supervisor cluster service 109 supplies a GCIS compatibility document 1214 for the upgrade to Kubernetes master 104.

At step 1408, supervisor cluster service 109 requests upgrade controller 1206 in GCIS 405 to perform a compatibility check on each guest cluster and the SDDC. At step 1410, upgrade controller 1206 retrieves the compatibility metadata, including GCIS compatibility document 1214, a relevant SDDC compatibility document 1210, and a GC compatibility document 1208 for each guest cluster. Upgrade controller 1206 determines the relevant SDDC compatibility document 1210 using the SDDC provider document 1212, which identifies the current version of the underling SDDC. A process of performing a compatibility check with this compatibility metadata is described below. At step 1412, upgrade controller 1206 computes compatibility for each guest cluster and the SDDC and returns the result to supervisor cluster service 109. At step 1414, VM management server 116 reports the compatibility check result to the VI admin.

Figure 15:
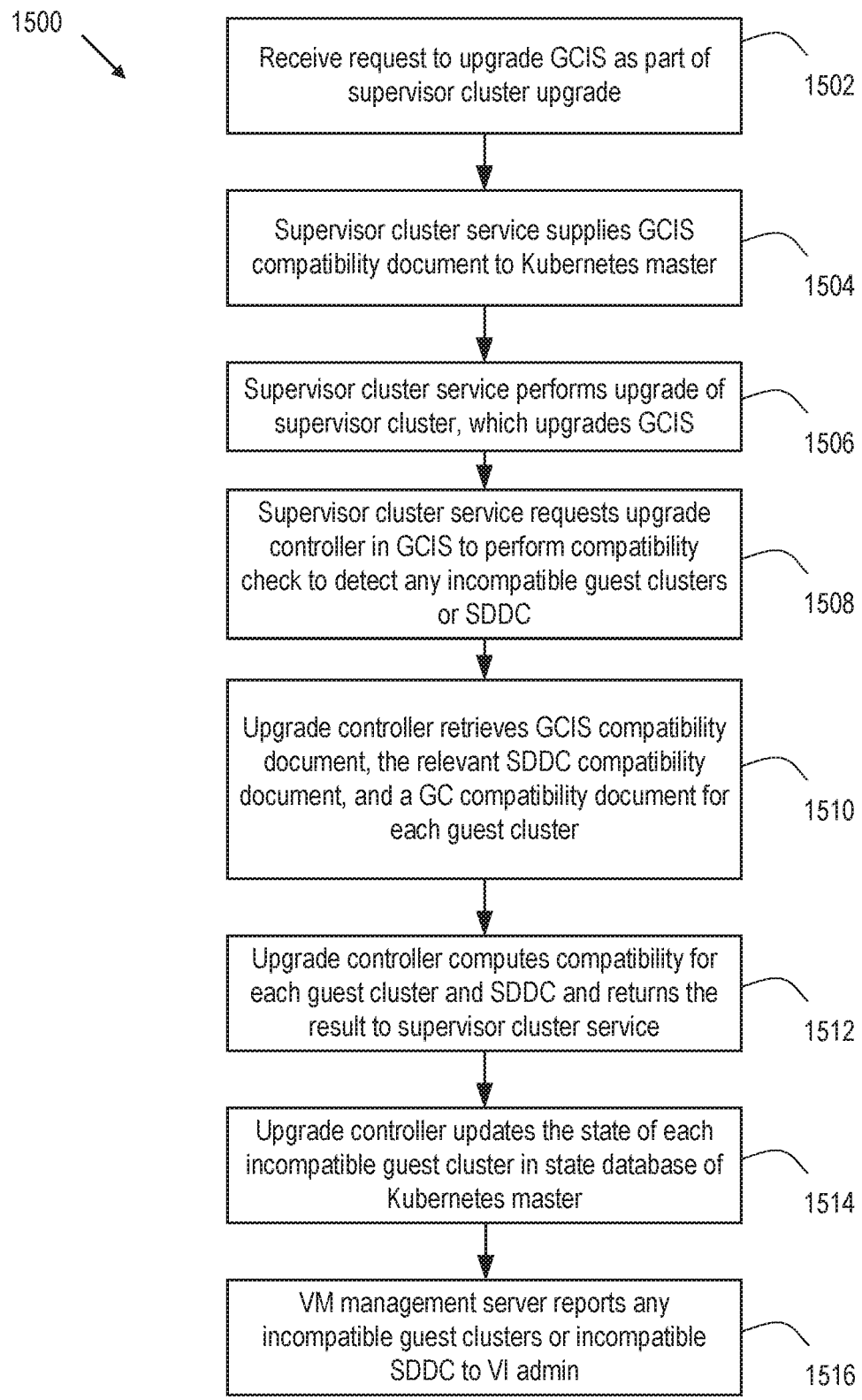
FIG. 15 is a flow diagram depicting a method of upgrading an orchestration control plane of a supervisor cluster according to an embodiment.

FIG. 15 is a flow diagram depicting a method 1500 of upgrading an orchestration control plane of a supervisor cluster according to an embodiment. Method 1500 can be performed by VM management server 116 and GCIS 405 and/or Kubernetes master 104, which comprise software executing on CPU, memory, storage, and network resources managed by a virtualization layer (e.g., a hypervisor) or host operating system. Method 1500 begins at step 1502, where VI admin interacts with VM management server 116 to request upgrade of GCIS 405 as part of an upgrade of orchestration control plane 115 of supervisor cluster 101. At step 1504, supervisor cluster service 109 supplies a GCIS compatibility document 1214 for the upgrade to Kubernetes master 104. At step 1506, supervisor cluster service 109 performs the requested upgrade of orchestration control plane 115, which updates GCIS 405.

At step 1508, supervisor cluster service 109 requests upgrade controller 1206 in GCIS 405 (newly upgraded) to perform a compatibility check to detect any incompatible guest clusters or incompatible SDDC component. At step 1510, upgrade controller 1206 retrieves the compatibility metadata, including GCIS compatibility document 1214, a relevant SDDC compatibility document 1210, and a GC compatibility document 1208 for each guest cluster. Upgrade controller 1206 determines the relevant SDDC compatibility document 1210 using the SDDC provider document 1212, which identifies the current version of the underling SDDC. A process of performing a compatibility check with this compatibility metadata is described below. At step 1512, upgrade controller 1206 computes compatibility for each guest cluster and SDDC and returns the result to supervisor cluster service 109. At step 1514, upgrade controller 1206 updates the state of each incompatible guest controller in state database 303 to indicate the incompatibility. At step 1516, VM management server 116 reports the results of any incompatible guest clusters and SDDC component to the VI admin. VM management server 116 can also notify other parties, such as dev/ops who manage the guest clusters.

Figure 16A:
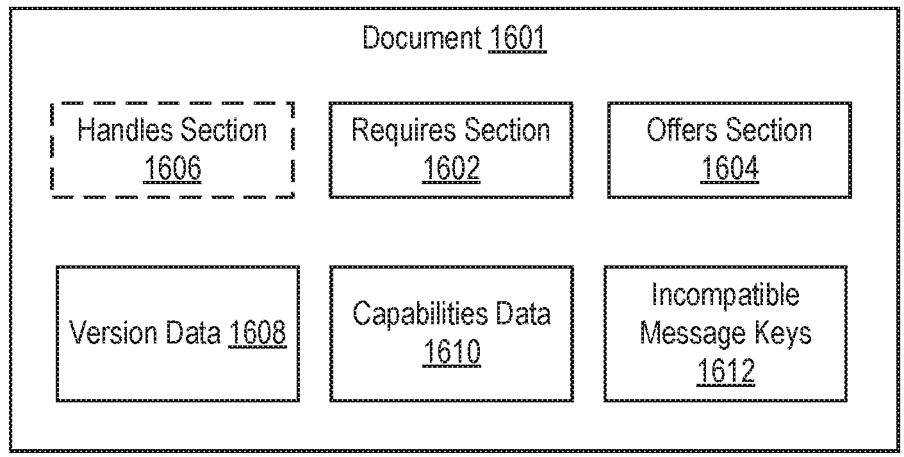
FIG. 16A is a block diagram depicting a logical view of a compatibility document according to an embodiment.

FIG. 16A is a block diagram depicting a logical view of a compatibility document 1601 according to an embodiment. Compatibility document 1601 has a format that can be used by any compatibility document described herein. Compatibility document 1601 includes a requires section 1602 and an offers section 1604. Requires section 1602 has minimum requirements for a component (e.g., GCIS 405, SDDC 402, or guest distro 1204). Offers section 1604 indicates capabilities of the component (e.g., GCIS 405, SDDC 402, or guest distro 1204). Requires section 1602 and offers section 1604 include version data 1608, compatibilities data 1610, and incompatible message keys 1612. Version data 1608 includes versions of components required or supported. The user of version data 1608 with requires section 1602 or offers section 1604 implies an interaction operation is performed during software compatibility check to determine compatibility. Capabilities data 1610 includes functional capabilities of components required or supported. Use of capabilities data 1610 with requires section 1602 or offers section 1604 implies that the compatibility offering party must completely satisfy the capabilities set in capabilities data 1610. Thus, capabilities data 1610 in compatibility document 1601 is a mathematical subset of the compatibility offering set.

Figure 16B:
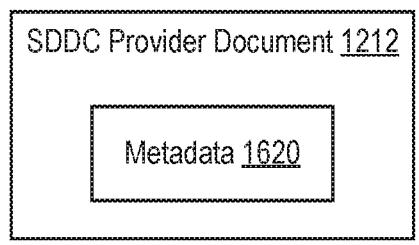
FIG. 16B is a block diagram depicting a logical view of SDDC provider document according to an embodiment.

In an embodiment, compatibility document 1601 includes a handles section 1606. In some cases, a component can have the capability to gracefully degrade based on the data contract available. For example, VM controller 316 can gracefully degrade if the SDDC does not provide a particular feature that VM controller supports. Handles section 1606 can include information under which a component can gracefully degrade. When upgrade controller 1206 evaluates handles section 1606, upgrade controller 1206 generates warnings instead of incompatibilities in case a requirement in the handles section is not met by an offering of the GCIS, guest cluster, or SDDC FIG. 16B is a block diagram depicting a logical view of SDDC provider document 1212 according to an embodiment. SDDC provider document includes metadata 1620 that identifies the version of the underling SDDC 402.

Figure 17:
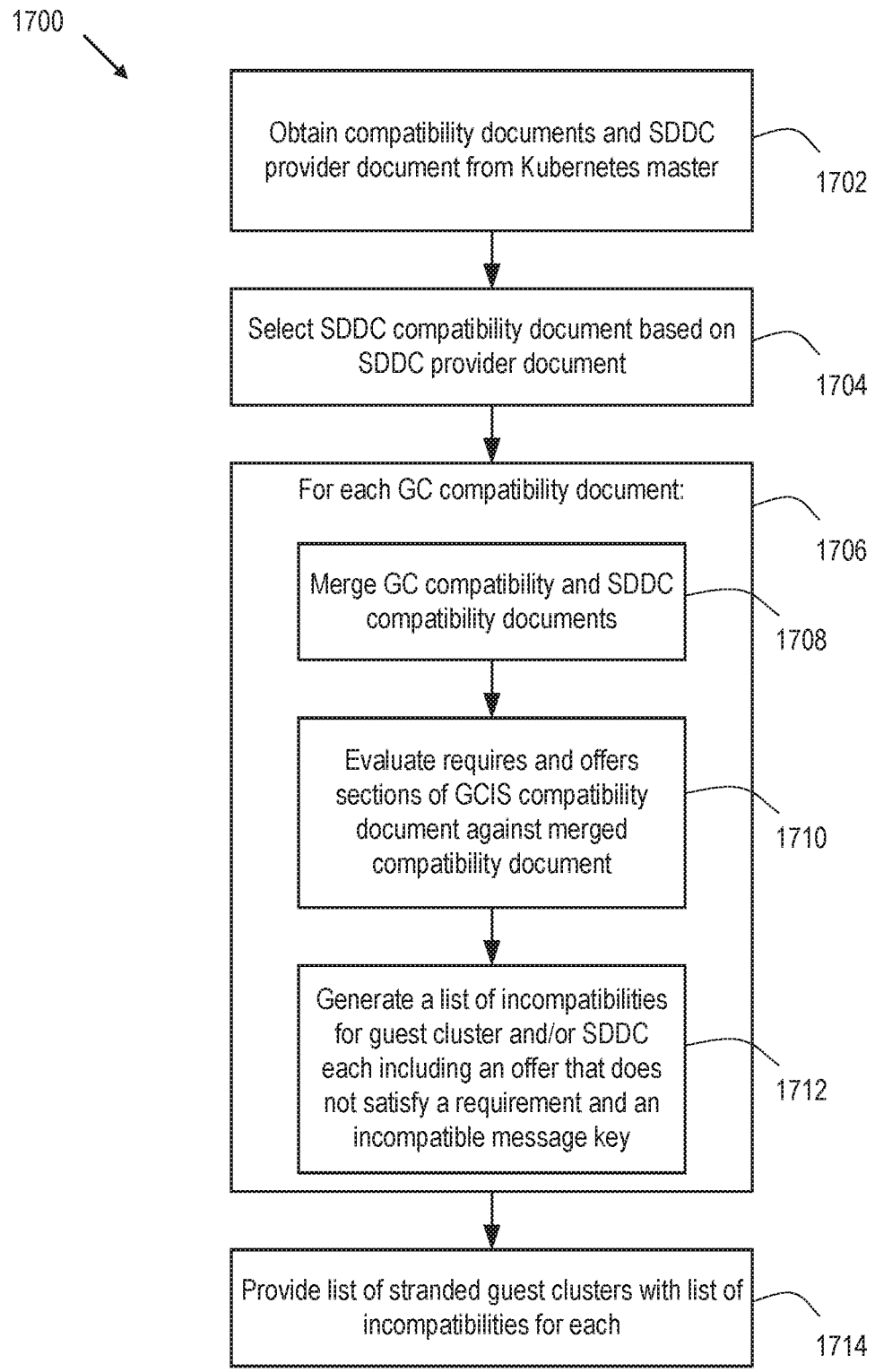
FIG. 17 is a flow diagram depicting a method of performing a compatibility check for guest clusters in a supervisor cluster according to an embodiment.

FIG. 17 is a flow diagram depicting a method 1700 of performing a compatibility check for guest clusters in a supervisor cluster according to an embodiment Method 1700 can be performed by GCIS 405 (e.g., upgrade controller 1206), which comprises software executing on CPU, memory, storage, and network resources managed by a virtualization layer (e.g., a hypervisor). Upgrade controller 1206 can perform method 1700 either during a compatibility pre-check (e.g., method 1400 in FIG. 14) or during a compatibility check after supervisor cluster upgrade (e.g., method 1500 in FIG. 15).

Method 1700 begins at step 1702, where upgrade controller 1206 obtains compatibility documents 1208, 1210, GCIS compatibility document 1214, and SDDC provider document 1212 from Kubernetes master 104. At step 1704, upgrade controller 1206 selects an SDDC compatibility document 1210 based on SDDC provider document 1212. At step 1706, upgrade controller 1206 performs steps 1708 through 1712 for each GC compatibility document 1208.

At step 1708, upgrade controller 1206 merges GC compatibility document 1208 with SDDC compatibility document 1210. From the perspective of GCIS 405, these compatibility documents are a single counterparty to the set of compatibility contracts. At step 1710, upgrade controller 1206 evaluates requires section 1602 of GCIS compatibility document 1214 against the merged compatibility offerings. For example, upgrade controller 1206 iterates through each requirement in requires section 1602 of GCIS compatibility document 1214. Upgrade controller 1206 looks for the offer in the merged set of offers that corresponds to the selected requirement. Upgrade controller 1206 then determines if the offer satisfies the requirement. If not, upgrade controller 1206 adds an incompatibility for the offer as not satisfying the requirement and appends the incompatible message key to indicate the component that fails compatibility. Upgrade controller 1206 then iterates through each offer in offers section 1604 of GCIS compatibility document 1214. Upgrade controller 1206 looks for requirements in the merged set of requires not met by the offer. If a requirement is not met, upgrade controller 1206 adds an incompatibility for the offer as not satisfying the requirement and appends the incompatible message key. For both requires and offers in GCIS compatibility document 1214, upgrade controller 1206 can determine whether an incompatibility exists by comparing version data 1608 with version data 1616 of the merged offerings/requirements.

At step 1712, upgrade controller 1206 generates a list of incompatibilities for the guest cluster each including what was offered, what was required, and an incompatible message key indicating the incompatible component. That is each incompatibility includes an offering of the guest cluster or SDDC that does not satisfy a requirement of the GCIS, or an offering of the GCIS that does not satisfy a requirement of the guest cluster or SDDC. The incompatible message key indicates which component's offering (e.g., a component in the guest cluster, SDDC, or GCIS) did not meeting a requirement. At step 1714, upgrade controller 1206 provides to VM management server 116 a list of stranded guest clusters with a list of incompatibilities with each of the stranded guest clusters.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method, during upgrade of an orchestration control plane, of checking compatibility of a guest cluster executing as a virtual extension of a host cluster having the orchestration control plane managing the guest cluster, the host cluster being part of a software defined data center (SDDC), the method comprising:
   receiving, at the orchestration control plane, a guest cluster infrastructure software (GCIS) compatibility document that specifies what a GCIS of the orchestration control plane requires and offers, the orchestration control plane integrated with virtualization software of the host cluster and configured to manage virtual machines (VMs) in which the guest cluster executes;
   receiving a request for a compatibility check on the guest cluster with respect to the GCIS;
   obtaining, at the orchestration control plane in response to the request, an SDDC compatibility document for the SDDC and a guest cluster compatibility document for the guest cluster;
   computing, at the orchestration control plane, the compatibility check in response to the GCIS compatibility document, the SDDC compatibility document, and the guest cluster compatibility document;
   transmitting a result of the compatibility check from the orchestration control plane to a virtual infrastructure (VI) control plane of the SDDC;
   upgrading, by a server executing in the SDDC in response to the result of the compatibility check, the orchestration control plane including the GCIS.

2. The method of claim 1, wherein the GCIS compatibility document is part of an upgrade to the orchestration control plane, and wherein the request for the compatibility check is received, prior to applying the upgrade to the orchestration control plane, in response to a request for a compatibility report at the VI control plane.

3. The method of claim 1, wherein the GCIS compatibility document is part of an upgrade to the orchestration control plane, and wherein the request for the compatibility check is received, after applying the upgrade to the orchestration control plane, in response to a request to detect whether the guest cluster is incompatible with the GCIS.

4. The method of claim 3, further comprising:
   updating state of the guest cluster as being incompatible with the GCIS, the state maintained in a database of a master server of the orchestration control plane.

5. The method of claim 1, wherein the step of computing the compatibility check comprises:
   merging the SDDC compatibility document and the guest cluster compatibility document into a merged compatibility document;
   evaluating a requires section of the GCIS compatibility document against an offers section in the merged compatibility document;
   evaluating an offers section of the GCIS compatibility document against a requires section in the merged compatibility document; and
   generating at least one incompatibility for the guest cluster each including an offering that does not satisfy a requirement.

6. The method of claim 5, wherein the at least one incompatibility for the guest cluster each includes an incompatible message key indicating which component has the offering that does not satisfy the requirement of the GCIS, the SDDC, or the guest cluster.

7. The method of claim 5, wherein the requires section of the GCIS compatibility document includes first version data, wherein the offers section in the merged compatibility document includes second version data, and wherein the step of evaluating includes comparing the first version data against the second version data.

8. A non-transitory computer readable medium comprising instructions to be executed in a computing device to cause the computing device to carry out a method of, during upgrade of an orchestration control plane, checking compatibility of a guest cluster executing as a virtual extension of a host cluster having the orchestration control plane managing the guest cluster, the host cluster being part of a software defined data center (SDDC), the method comprising:

receiving, at the orchestration control plane, a guest cluster infrastructure software (GCIS) compatibility document that specifies what a GCIS of the orchestration control plane requires and offers, the orchestration control plane integrated with virtualization software of the host cluster and configured to manage virtual machines (VMs) in which the guest cluster executes;

receiving a request for a compatibility check on the guest cluster with respect to the GCIS;

obtaining, at the orchestration control plane in response to the request, an SDDC compatibility document for the SDDC and a guest cluster compatibility document for the guest cluster;

computing, at the orchestration control plane, the compatibility check in response to the GCIS compatibility document, the SDDC compatibility document, and the guest cluster compatibility document;

transmitting a result of the compatibility check from the orchestration control plane to a virtual infrastructure (VI) control plane of the SDDC;

upgrading, by a server executing in the SDDC in response to the result of the compatibility check, the orchestration control plane including the GCIS.

9. The non-transitory computer readable medium of claim 8, wherein the GCIS compatibility document is part of an upgrade to the orchestration control plane, and wherein the request for the compatibility check is received, prior to applying the upgrade to the orchestration control plane, in response to a request for a compatibility report at the VI control plane.

10. The non-transitory computer readable medium of claim 8, wherein the GCIS compatibility document is part of an upgrade to the orchestration control plane, and wherein the request for the compatibility check is received, after applying the upgrade to the orchestration control plane, in response to a request to detect whether the guest cluster is incompatible with the GCIS.

11. The non-transitory computer readable medium of claim 10, further comprising:
updating state of the guest cluster as being incompatible with the GCIS, the state maintained in a database of a master server of the orchestration control plane.

12. The non-transitory computer readable medium of claim 8, wherein the step of computing the compatibility check comprises:
merging the SDDC compatibility document and the guest cluster compatibility document into a merged compatibility document;
evaluating a requires section of the GCIS compatibility document against an offers section in the merged compatibility document;
evaluating an offers section of the GCIS compatibility document against a requires section in the merged compatibility document; and
generating at least one incompatibility for the guest cluster each including an offering that does not satisfy a requirement.

13. The non-transitory computer readable medium of claim 12, wherein the at least one incompatibility for the guest cluster each includes an incompatible message key indicating which component has the offering that does not satisfy the requirement of the GCIS, the SDDC, or the guest cluster.

14. The non-transitory computer readable medium of claim 12, wherein the requires section of the GCIS compatibility document includes first version data, wherein the offers section in the merged compatibility document includes second version data, and wherein the step of evaluating includes comparing the first version data against the second version data.

15. A virtualized computing system, comprising:
a host cluster being part of a software defined data center (SDDC), the host clustering including hosts each having a processor and a memory; and
a guest cluster executing on the hosts as a virtual extension of a host cluster having an orchestration control plane managing the guest cluster;
the orchestration control plane configured to:
receive a guest cluster infrastructure software (GCIS) compatibility document that specifies what a GCIS of the orchestration control plane requires and offers, the orchestration control plane integrated with virtualization software of the host cluster and configured to manage virtual machines (VMs) in which the guest cluster executes;
receiving a request for a compatibility check on the guest cluster with respect to the GCIS;
obtain, in response to the request, an SDDC compatibility document and a guest cluster compatibility document for the guest cluster;
computing the compatibility check in response to the GCIS compatibility document, the SDDC compatibility document, and the guest cluster compatibility document;
transmitting a result of the compatibility check from to a virtual infrastructure (VI) control plane of the SDDC;
upgrading, by the VI control plane in response to the result of the compatibility check, the orchestration control plane including the GCIS.

16. The virtualized computing system of claim 15, wherein the GCIS compatibility document is part of an upgrade to the orchestration control plane, and wherein the request for the compatibility check is received, prior to applying the upgrade to the orchestration control plane, in response to a request for a compatibility report at the VI control plane.

17. The virtualized computing system of claim 15, wherein the GCIS compatibility document is part of an upgrade to the orchestration control plane, and wherein the request for the compatibility check is received, after applying the upgrade to the orchestration control plane, in response to a request to detect whether the guest cluster is incompatible with the GCIS.

18. The virtualized computing system of claim 17, wherein the orchestration control plane is configured to update state of the guest cluster as being incompatible with the GCIS, the state maintained in a database of a master server of the orchestration control plane.

19. The virtualized computing system of claim 15, wherein the orchestration control plane is configured to compute the compatibility check by:
merging the SDDC compatibility document and the guest cluster compatibility document into a merged compatibility document;
evaluating a requires section of the GCIS compatibility document against an offers section in the merged compatibility document;
evaluating an offers section of the GCIS compatibility document against a requires section in the merged compatibility document; and
generating at least one incompatibility for the guest cluster each including an offering that does not satisfy a requirement.

20. The virtualized computing system of claim 19, wherein the at least one incompatibility for the guest cluster each includes an incompatible message key indicating which component has the offering that does not satisfy the requirement of the GCIS, the SDDC, or the guest cluster.

* * * * *